United States Patent
Firkins et al.

(10) Patent No.: US 9,557,735 B2
(45) Date of Patent: Jan. 31, 2017

(54) METHODS AND APPARATUS TO MANAGE PROCESS CONTROL STATUS ROLLUPS

(75) Inventors: Molly Marie Firkins, Cedar Park, TX (US); Stephen C. Gilbert, Austin, TX (US); Cindy Scott, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 686 days.

(21) Appl. No.: 12/635,236

(22) Filed: Dec. 10, 2009

(65) Prior Publication Data

US 2011/0144777 A1 Jun. 16, 2011

(51) Int. Cl.
G06F 19/00 (2011.01)
G05B 23/02 (2006.01)
G05B 19/418 (2006.01)
G06F 3/048 (2013.01)

(52) U.S. Cl.
CPC ........... G05B 23/027 (2013.01); G05B 19/418 (2013.01); G05B 23/0272 (2013.01); G05B 2219/31472 (2013.01); G05B 2219/32128 (2013.01); G06F 3/048 (2013.01)

(58) Field of Classification Search
CPC .................. G06Q 10/0639; G06Q 10/063114; G05B 2219/32191; G05B 19/41875; G05B 19/41865; G05B 23/0232; G05B 23/027; G05B 2219/31395; G05B 2219/32128; G05B 2219/32179; G05B 2219/32196; G05B 2219/32222
USPC ........ 700/13, 17, 19, 83, 106, 109; 715/273, 715/717, 736; 340/506, 511, 525; 702/185–186, 702/188
See application file for complete search history.

(56) References Cited

U.S. PATENT DOCUMENTS

| 4,902,469 | A | 2/1990 | Watson et al. |
|---|---|---|---|
| 4,947,095 | A | 8/1990 | Kawamura et al. |
| 5,132,920 | A | 7/1992 | Bellows et al. |
| 5,187,776 | A | 2/1993 | Yanker |
| 5,420,977 | A | 5/1995 | Sztipanovits |

(Continued)

FOREIGN PATENT DOCUMENTS

| JP | 2000081909 | 3/2000 |
|---|---|---|
| JP | 2002014721 | 1/2002 |

(Continued)

OTHER PUBLICATIONS

AMO State based Alarm Handler, PAS-Alarm Management Optimization, downloaded on Mar. 15, 2007, from http://www.dot-products.com/AlarmHandler.aspx, 2006 PAS, Inc., 1 page.

(Continued)

*Primary Examiner* — Darrin Dunn
(74) *Attorney, Agent, or Firm* — Hanley, Flight & Zimmerman, LLC

(57) ABSTRACT

Example methods and apparatus to manage process control status rollups are disclosed. A disclosed example method includes receiving process control information from at least one process control device included within a process control system, determining at least one issue associated with a portion of the received process control information, receiving a selection of a status type, determining if the at least one issue is associated with the selected status type, and displaying a process control status rollup associated with the selected status type and including the at least one issue.

33 Claims, 15 Drawing Sheets

(56) References Cited

U.S. PATENT DOCUMENTS

| | | | |
|---|---|---|---|
| 5,638,523 A | 6/1997 | Mullet et al. | |
| 5,694,532 A * | 12/1997 | Carey | G06F 3/04842 |
| | | | 345/419 |
| 5,859,885 A | 1/1999 | Rusnica et al. | |
| 5,914,875 A | 6/1999 | Monta et al. | |
| 5,923,325 A | 7/1999 | Barber et al. | |
| 5,995,916 A | 11/1999 | Nixon et al. | |
| 6,288,702 B1 | 9/2001 | Tachibana et al. | |
| 6,335,740 B1 | 1/2002 | Tanaka | |
| 6,356,917 B1 | 3/2002 | Dempsey et al. | |
| 6,392,667 B1 | 5/2002 | McKinnon et al. | |
| 6,396,516 B1 | 5/2002 | Beatty | |
| 6,414,594 B1 | 7/2002 | Guerlain | |
| 6,418,426 B1 * | 7/2002 | Schlesinger | G06F 17/30575 |
| | | | 707/610 |
| 6,421,571 B1 | 7/2002 | Spriggs et al. | |
| 6,462,750 B1 | 10/2002 | Plow et al. | |
| 6,492,901 B1 | 12/2002 | Ridolfo | |
| 6,559,872 B1 | 5/2003 | Lehikoinen et al. | |
| 6,754,664 B1 | 6/2004 | Bush | |
| 6,774,786 B1 | 8/2004 | Havekost | |
| 7,000,193 B1 | 2/2006 | Impink, Jr. et al. | |
| 7,030,747 B2 | 4/2006 | Scott et al. | |
| 7,137,074 B1 | 11/2006 | Newton | |
| 7,250,856 B2 | 7/2007 | Havekost et al. | |
| 2002/0055790 A1 * | 5/2002 | Havekost | 700/80 |
| 2002/0077711 A1 | 6/2002 | Nixon et al. | |
| 2003/0085887 A1 * | 5/2003 | Hunt | G06T 17/00 |
| | | | 345/418 |
| 2004/0189717 A1 * | 9/2004 | Conally | G06F 3/0481 |
| | | | 715/853 |
| 2005/0012608 A1 | 1/2005 | Havekost et al. | |
| 2005/0015176 A1 | 1/2005 | Harada et al. | |
| 2005/0033466 A1 * | 2/2005 | Eryurek et al. | 700/108 |
| 2005/0222698 A1 | 10/2005 | Eryurek et al. | |
| 2005/0278378 A1 * | 12/2005 | Frank | G06F 17/30616 |
| 2006/0191993 A1 | 8/2006 | Markham et al. | |
| 2008/0066019 A1 * | 3/2008 | Worek et al. | 715/965 |
| 2008/0300698 A1 * | 12/2008 | Havekost et al. | 700/83 |
| 2009/0065578 A1 * | 3/2009 | Peterson et al. | 235/382 |
| 2009/0105855 A1 * | 4/2009 | Mehta et al. | 700/89 |
| 2010/0156655 A1 * | 6/2010 | Bullemer | G05B 19/406 |
| | | | 340/691.6 |
| 2010/0306195 A1 * | 12/2010 | Wagener et al. | 707/736 |

FOREIGN PATENT DOCUMENTS

| | | |
|---|---|---|
| JP | 2002222012 | 8/2002 |
| JP | 2004038596 | 2/2004 |

OTHER PUBLICATIONS

AMO Documentation and Rationalization, PAS-Alarm Management Optimization, downloaded on Mar. 15, 2007, from http://www.dot-products.com/docandrat.aspx, 2006 PAS, Inc., 1 page.

DeltaV Operate for PROVOX, Products Data Sheet, Emerson Process Management, Nov. 2005, 12 pages.

Download Yahoo! Installer; Author Unknown; http://downloads.yahoo.com/installer/?done=close&pname=the%2Dealendar%20Widget; Jun. 23, 2008; 1 page.

UK Search Report Corresponding to Application No. GB0805515.4, Jun. 11, 2008, 3 pages.

Search Report under Section 17(5), issued by the British Intellectual Property Office in connection with British Application No. GB1019647.5, on Mar. 17, 2011, 3 pages.

The State Intellectual Property Office of the People's Republic of China, "First Office Action," issued in connection with the Chinese Patent Application Serial No. 201010589132.4, mailed on Apr. 1, 2013, 19 pages.

Japanese Patent Office, "Notice of Reasons for Rejection", issued in connection with Japanese patent application No. 2010-272010, Jul. 29, 2014, 7 pages.

The State Intellectual Property Office of the People's Republic of China, "The Second Office action", issued in connection with Chinese patent application No. 201010589132.4, mailed on Nov. 24, 2014, 26 pages.

Chinese Patent Office, "Decision of Rejection" issued in connection with Chinese patent application No. 201010589132A, mailed on Jun. 3, 2015, 28 pages.

State Intellectual Property Office of the Peoples Republic of China, "Notification of the Third Dffice Action", issued in connection with Chinese patent application No. 201010589132A, Feb. 14, 2016, 7 pages.

Great Britain Patent Office, "Examination Report under Section 18(3)", issued in connection with British patent application No. GB1019647.5, Aug. 12, 2015, 4 pages.

Japan Patent Office, "Notice of Reasons for Rejection," issued in connection with Japanese Patent Application No. 2015-156904, mailed on May 31, 2016, 3 pages.

* cited by examiner

METHODS AND APPARATUS TO MANAGE PROCESS CONTROL STATUS ROLLUPS

FIELD OF THE DISCLOSURE

The present disclosure relates generally to process control systems and, more particularly, to methods and apparatus to manage process control status rollups.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies or routines using the field devices via the buses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Process control systems typically include alarms to alert operators to conditions or issues that are outside a normal operating process. Further, process control systems may include monitoring information and/or diagnostics to monitor process control routines, field devices, controllers, and/or communications within the process control systems. Currently, an operator of a process may have to manually configure a display of alarms, monitoring information, or diagnostics in a user interface that may be specific to a process area, a group of field devices, a portion of a process, and/or process control components under the control of an operator. However, this manual configuration may be burdensome for process control operators because a user interface may have to be constructed for each operator, process control system, process control area, and/or group of field devices. The manual configuration may also produce user interface screens with overlapping alerts, monitoring information, and/or diagnostics. Further, when a process control system is modified, the corresponding user interfaces may also have to be changed to reflect the modification.

SUMMARY

Example methods and apparatus to manage process control status rollups are described. In one example, a method includes receiving process control information from at least one process control device included within a process control system and determining at least one issue associated with a portion of the received process control information. The example methods further include receiving a selection of a status type, determining if the at least one issue is associated with the selected status type, and displaying a process control status rollup associated with the selected status type and including the at least one issue.

An example apparatus includes an issue detector to determine at least one issue associated with a portion of received process control information and a rollup processor to determine if the at least one issue is associated with a selected status type. The example apparatus also includes a display manager to display a process control status rollup associated with the selected status type and including the at least one issue.

DETAILED DESCRIPTION

Figure 1:
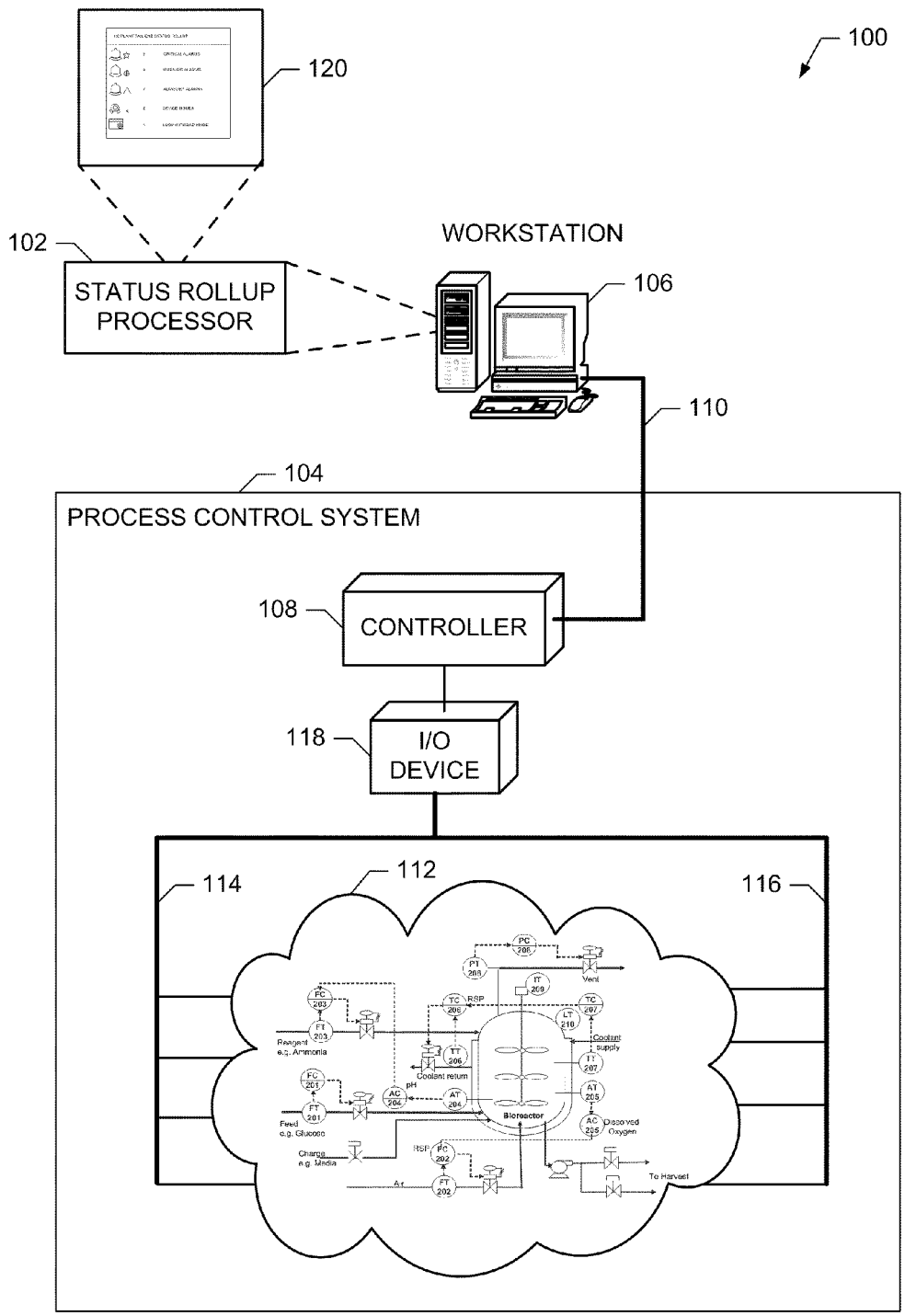
FIG. 1 shows a block diagram illustrating an example process control system including an example status rollup processor.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with managing status rollups in a process control system, the example method and apparatus are more generally applicable and may be implemented to manage rollup information within any automation system, batch processing system, manufacturing system, industrial control system, safety instrumented system, etc.

Typically, process control systems include alarms, monitors, and/or diagnostics to alert operators to conditions and/or issues that are outside a normal operating process. Process control systems may include sensors, monitors and/or diagnostics to monitor process control routines, field devices, controllers, and/or communications within the process control systems. Further, many process control systems may be displayed as a schematic that includes a graphical representation of field devices, interconnections between the field devices, communications between the field devices, outputs of the field devices, functional states of the field devices, and/or any other information that may be associated with a process control system. Additionally, a schematic may show an entire process control system or, alternatively, one or more portions of a process control system.

Currently, a summary of process control issues, alarms, monitoring information, and/or diagnostics may be configured manually by an operator and/or a process control engineer based on known components within a process control schematic, a functional block diagram, and/or any other representation of a process control system. However, once the schematics are created, a summary user interface of alarms, issues, diagnostics, and/or monitoring information corresponding to the schematic are fixed to the views specified by the engineer and/or operator. For example, a summary user interface of a process control plant may include alarms, monitoring devices, and/or status of field devices. However, if an operator changes the display of the schematic to view only a portion of the schematic, the summary user interface may be not be configured for the viewed portion because the summary user interface was manually designed for the complete schematic. A summary user interface may not be created for each possible portion of the schematic because it would be difficult for an engineer to determine or predict which portions of a process control system an operator may choose to view. In another example, a process control engineer may create a schematic that represents an entire process control system. Further, the engineer may create schematics of a front portion of the process control system, a middle portion of the process control system, and a back portion of the process control system. In yet other examples, the process control engineer may create a schematic that represents an area and/or components based on specific user-defined criteria (e.g., batch area, operator area of control, etc.). Additionally, the operator may have to manually configure a display of alarms, monitoring information, and/or diagnostics in a summary user interface for each created schematic.

Manual configuration such as that noted above may be burdensome for process control engineers because a user interface may have to be constructed for each process control area. The manual configuration may also produce user interface screens with overlapping alerts, monitoring information, and/or diagnostics. For example, some alerts may be included within the front portion and the middle portion of a process control system. Further, when a process control system is modified, the corresponding user interfaces may also have to be modified to reflect the changes. Thus, the alerts that may be displayed within a schematic are static and based on initial setup by an operator and/or engineer. In examples where an operator may zoom into or otherwise select for viewing a portion of a schematic, the alerts, monitoring information, and/or diagnostics may not update to match the viewed schematic.

The example methods and apparatus described herein manage the display of alarm information, monitoring information, diagnostic information, and/or issue information in a status rollup that corresponds to a selected and/or viewed portion of a graphical representation of a process control system. A selected portion of a process control system (e.g., a component type) may include, but is not limited to a field device, a selection of field devices, a selection of process control components, a selection of a process control unit of equipment, an area of field devices in a process control system, a process control area, an area of control of an operator, a batch area, field devices associated with a batch process, and/or a display area of a schematic corresponding to a portion of a process control system.

A status rollup is a summary that may display a number of issues, alarms, monitoring information, message information, and/or diagnostics associated with a process control system. A status rollup may group the issues, alarms, monitoring information, message information, and/or diagnostics by a status type and/or by a priority or severity type. The example methods and apparatus automatically display the information within a status rollup based on criteria specified by a process control engineer and/or operator. The methods and apparatus described herein may display a status rollup based on, for example, a selected component, a status type, and/or a time period. Status rollups based on a selected component may show issues arranged by status type that are associated with the component. Status rollups based on a selected status type may show alarms, diagnostics, monitoring information, message information, and/or issues associated with the status type arranged by a sub-status type, by a priority, and/or by a severity. Further, status rollups based on a selected status type may show process control information and/or any other information associated with each status issue that corresponds to the status type.

Alarms may include alerts indicating a portion of a process and/or a field device is outside a normal operating condition. Diagnostics may include information regarding the functionality and/or operability of field devices and/or portions of a process control system. Monitoring information may include process data that is sensed and/or detected by field devices and/or portions of a process control system. Message information may include operator and/or routine generated messages and/or instructions regarding a state of a field device and/or a portion of process control information. Issues may include any type of failure and/or deviation of any field device and/or portion of a process control system.

The example methods and apparatus described herein may receive a selection of a status issue and display a status rollup of process information associated with the selected status issue. Types of status issues may include alarms, messages, simulations, field device issues, field device conditions, scheduled device maintenance events, abnormal conditions, unspecified conditions, field device maintenance conditions, field device status conditions, control (e.g., process control routine and/or algorithm) issue conditions, configuration errors, altered alarms, action requests, altered field devices, control bypasses, process control routines with improper modes, process control routines with issues, alarms with issues, and/or any user defined conditions.

The selection of a status type may result in the display of corresponding status issues within a displayed portion of a process control system. For example, typical process control schematics include field devices that may be associated with one or more tags. A tag is a label that may be displayed adjacent to a process control component to indicate information associated with that component. The tag may include a name tag that includes a unique identifier assigned to a field device. Further, the tag may include a control tag that may represent status information about a field device including I/O values associated with the field device, an operational state of the field device, alarms triggered by the field device, if the field device needs to be calibrated, etc. However, in current schematic displays, a field device with many active tags may have some tags partially hidden from view by other tags. The example methods and apparatus manage status rollups such that issues within a selected portion of a process control system may be grouped by a type of status issue and shown within a status rollup that is relatively easily viewable by an operator and/or engineer. Further, the operator may select a type of status issue to display corresponding issues associated with components and/or field devices within a selected portion of a process control system. In this manner, the example methods and apparatus provide viewable status issues for an operator regardless of the ability to view the tags associated with each field device and/or component.

Further, the example methods and apparatus described herein enable an automatic display of status rollup information without process control operators and/or engineers having to change a hierarchy of equipment to match standard displays of process control schematics. Thus, the example status rollups displayed to an operator include status issues associated with the portion of a process control system viewed by the operator. In examples where portions of a process control system are displayed based on a span of control of an operator, the example methods and apparatus automatically configure a status rollup based on the displayed portion. Additionally, in examples where an operator may be privileged to view portions of a process control system but not necessarily modify any and/or all of the components within the portion(s), the example methods and apparatus described herein may display a status rollup associated with the displayed portion(s) of the status rollup. Further, any process control information, issues, alerts, and/or diagnostics that are inter-related to portions of a schematic that are not displayed may be reflected in the status rollup if a portion of the schematic that is displayed is associated with any of the process control information, issues, alerts, and/or diagnostics.

Furthermore, the example methods and apparatus described herein enable an operator to determine status issues within portions of a process control system by highlighting components associated with a status issue within a corresponding process control schematic. For example, the methods and apparatus may enable an operator to view a status rollup of a status type related to field devices with issues. The operator may then select these issues to be highlighted within a corresponding process control schematic. Upon receiving the selection from the operator, the example method and apparatus may then conceal, darken, or obscure the un-selected portions of the process control system while leaving the selected portions un-concealed, un-darkened, and/or un-obscured. Additionally, the example methods and apparatus may display a light and/or a flash around the selected portions of the process control system within the schematic. An operator may then relatively easily find the field devices within the process control system schematic associated with the selected status type to determine the cause(s) of the issues.

Additionally, the example methods and apparatus described herein may manage status rollups based on a selected time and/or time period. For example, a process control operator may select a time (e.g., a snapshot of a process control system). The methods and apparatus may then display within a user interface a schematic and a corresponding status rollup indicating status issues that occurred at the selected time. In another example, an operator may select a time period. The example methods and apparatus may then display a schematic and a corresponding status rollup indicating any status issues that occurred during the specified period of time. A period of time may include a shift of an operator, a batch process time, and/or any other period of time that may be of interest to a process control engineer and/or operator.

FIG. 1 is a block diagram showing an example process control environment 100 including an example status rollup processor 102. The example status rollup processor 102 is located within a process control system 104. Additionally, the status rollup processor 102 may be implemented by and/or included within a workstation 106. In other example implementations, the status rollup processor 102 may be included within a server, a distributed computing network, and/or any other computing device(s) that may be communicatively coupled to the workstation 106.

The example workstation 106 of FIG. 1 may include any computing device including a personal computer, a laptop, a server, a controller, a personal digital assistant (PDA), a micro computer, etc. The workstation 106 may be implemented using any suitable computer system or processing system (e.g., the processor system P10 of FIG. 12). For example, the workstation 106 could be implemented using a single processor personal computer, single or multi-processor workstations, etc.

The example process control system 104 may include any type of manufacturing facility, process facility, automation facility, safety instrumented facility, and/or any other type of process control structure or system. In some examples, the process control system 104 may include multiple facilities located at different locations. Additionally, the example process control environment 100 may include other process control systems (not shown) that may be included within the same facility and/or located at a different facility.

The example process control system 104 includes a controller 108 that may be communicatively coupled to the workstation 106 via a local area network (LAN) 110. The LAN 110 may be implemented using any desired communication medium and protocol. For example, the LAN 110 may be based on a hardwired or wireless Ethernet communication scheme. However, any other suitable communication medium and protocol could be used. Furthermore, although a single LAN 110 is shown, more than one LAN and appropriate communication hardware within the workstation 106 may be used to provide redundant communication paths between the workstation 106 and a respective similar workstation (not shown).

Additionally, the process control environment 100 may include routers (not shown) to communicatively couple other workstations (not shown) to the controller 108 and/or to communicatively couple the workstation 106 to controllers (not shown) within other process control systems. Further, the process control environment 100 may include a firewall (not shown) to provide remote workstations (e.g., workstations outside of the process control environment 100) access to resources within the process control environment 100.

The process control system 104 includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The control devices may receive instructions from the controller 108 via inputs 114 to execute a specified command and cause a change to the process implemented and/or controlled by the field devices 112. Furthermore, the measurement devices measure process data, environmental data, and/or input device data and transmit the measured data via outputs 116 to the controller 108 as process control information. This process control information may include the values of variables corresponding to a measured output from each field device.

In the illustrated example of FIG. 1, the example controller 108 may communicate with the field devices 112 within the process control system 104 via inputs 114 and/or outputs 116. The inputs 114 and outputs 116 may be implemented by a data bus. This data bus may be coupled to intermediate communication components within the process control system 104. These communication components may include field junction boxes to communicatively couple the field devices 112 in a command area to the data bus. Additionally, the communication components may include marshalling cabinets to organize the communication paths to the field devices 112 and/or field junction boxes. Furthermore, the communication components may include I/O cards 118 (e.g., an I/O device) to receive data from the field devices 112 and convert the data into communications capable of being received by the example controller 108. Additionally, these I/O cards 118 may convert data or communications from the controller 108 into a data format capable of being processed by the corresponding field devices 112. In an example, the data bus may be implemented using the Fieldbus protocol or other types of wired and/or wireless communication protocols (e.g., Profibus protocol, HART protocol, etc.).

The example controller 108 of FIG. 1 manages one or more control routines (e.g., process control algorithms, functions, and/or instructions) to manage the field devices 112 within the process control system 104. The control routines may include process monitoring applications, alarm management applications, process trending and/or history applications, diagnostic applications, batch processing and/or campaign management applications, statistical applications, streaming video applications, advanced control applications, safety instrumented applications, etc. Furthermore, the controller 108 forwards process control information to the example status rollup processor 102. The control routines may ensure that the process control system 104 produces specified quantities of a desired product within a certain quality threshold. For example, the process control system 104 may be configured as a batch system that produces a product at a conclusion of a batch. In other examples, the process control system 104 may include a continuous process manufacturing system that constantly produces products.

The example workstation 106 and/or other workstations with access to the process control system 104 may be configured to view, modify, and/or correct one or more processes within the process control system 104. For example the workstation 106 may include a user interface 120 that formats, manages, and/or displays process control information generated by the status rollup processor 102. The user interface 120 may include a graphical window that may be displayed within the workstation 106 to show one or more status rollups adjacent and/or in conjunction with process control graphical representations (e.g., functional block diagrams and/or schematics). The workstation 106 may be capable of displaying more than one user interface 120 that may be communicatively coupled to the status rollup processor 102.

The example user interface 120 in FIG. 1 shows a status rollup associated with the field devices 112. The status rollup processor 102 monitors the process control routine and/or process control information transmitted by the controller 108 to identify and/or determine status issues. The process control information may originate from a process control device which may include, for example, the field devices 112, the controller 108, a component within the process control system 104, etc. Alternatively, the process control information and/or status information may be generated by applications. The applications may utilize process control information from the field devices 112 and/or the controller 108 to calculate and/or determine status information and/or other process control information. For example, the InSight application and/or the Syncade workorder application sold by Fisher-Rosemount Systems, Inc., an Emerson Process Management company, may determine if tuning parameters generated by the field devices 112 are within a specified threshold. If the tuning parameters are outside the threshold, the InSight application and/or the Syncade workorder application may generate status information to indicate the deviation.

In some examples, the status issues may be identified by process control data that is labeled as a status issue. In other examples, the status issues may be determined by the status rollup processor 102 based on specified criteria that may include, for example, message identifiers associated with alert messages, monitoring information, alarm data, diagnostic data, calibration data, and/or field device output data. Further, the status rollup processor 102 may compare process control data to specified thresholds to determine field device issues and/or any other issues that may be associated with the process control system 104.

The example status rollup processor 102 also monitors selections by a process control operator and/or engineer of a process control system via the workstation 106. Selections may include opening and/or displaying a functional block diagram associated a process control routine that controls the field devices 112 and/or the process control system 104, a schematic of the field devices 112 and/or the process control system 104, a data directory or database associated with the field devices 112 and/or the process control system 104, and/or any other item that may be displayed to describe or graphically represent the field devices 112 and/or the process control system 104. Further, selections may include viewing components within the process control system 104 that correspond to an area of control assigned to an operator, an area of control associated with a job and/or task type of an operator, a severity and/or priority, a batch, and/or a specified group of tags.

The status rollup processor 102 receives the selections and creates a status rollup based on the selections. In some examples, an operator may select to view a schematic of the process control system 104 within the workstation 106. Upon receiving the selection, the status rollup processor 102 may determine any status issues associated with the process control system 104, organize the status issues by issue status type, priority, severity, sub-type, etc., and/or display the status issues within a status rollup in a graphical format adjacent to the schematic within the workstation 106.

The status rollup processor 102 determines which status issues may be associated with a selected and/or a displayed portion of the process control system 104 based on tags and/or identifiers associated with the displayed field devices 112 or components associated with the displayed and/or selected field devices 112. In some examples, a selection may include a selection of a component type including a field device type, a selection of field devices, a selection of process control components, a selection of a process control unit of equipment, an area of field devices in the process control system, a process control area, an area of control of an operator, a batch area, field devices associated with a batch process, or a display area of a schematic. Each selected component type may include a tag and/or identifier that the status rollup processor 102 may use to cross-reference to process control information associated with the process control system 104. The status rollup processor 102 may then filter the process control information based on the selected and/or displayed tags and/or identifiers and compile any status issues identified within the filtered process control information.

The compiled status issues may include a number of each status type, alarm information, monitoring information, and/or diagnostic information. A status rollup may group the issues, alarms, and/or diagnostics by status type and/or a by a priority or severity type. Types of status issues may include alarms, messages, simulations, field device issues, field device conditions, abnormal conditions, knowledge available conditions, field device maintenance conditions, field device status conditions, control (e.g., process control routine and/or algorithm) issue conditions, configuration errors, altered alarms, action requests, altered field devices, control bypasses, process control routines with improper modes, process control routines with issues, alarms with issues, and/or any user defined conditions.

Further, upon viewing a status rollup for a selected portion of the process control system 104, the example status rollup processor 102 may display process control information associated with a selected status type within another status rollup. For example, an operator may select a status type of field device issues within a status rollup. Upon receiving the selection, the status rollup processor 102 compiles process control information associated within each field device issue summarized within the status rollup and displays the information for each device issue in another status rollup. This additional status rollup may be used by the operator to view specific information for each field device issue to correct the field device issues.

In the example of FIG. 1, an operator may select to view the field devices 112 within the workstation 106. The status rollup processor 102 detects the selection of the field devices 112, determines identifiers associated with the field devices 112, and filters process control data from the controller 108 that is associated with the field devices 112 based on the identifiers. For example, the field devices 112 may include a pump with an identifier of FT-202. To determine any status issues associated with the FT-202 pump, the status rollup processor 102 determines any process control information that may include and/or reference the FT-202 identifier. The status rollup processor 102 then identifies any status issues within the filtered process control data, compiles any determined status issues, and displays the status issues within the status rollup displayed by the user interface 120. If an operator selects one or more status types, the status rollup processor 102 may further filter the determined status issues by the selected status type(s) and display the filtered status issues within another status rollup within the user interface 120. In some examples, the other status rollup may include process control information associated with the selected status type(s).

Further, while the workstation 106 is displaying the field devices 112 an operator may select a portion of the field devices 112 (e.g., the field devices adjacent to the Bioreactor) to view only the selection within the workstation 106. The operator may select the portion to have a zoomed-in view of that portion to troubleshoot any possible issues. Upon receiving an indication of the selection, the example status rollup processor 102 determines the status issues that are associated with the selected portion and displays those status issues within a status rollup within the user interface 120. In this manner, the status rollup processor 102 ensures that a status rollup is displayed that corresponds to a currently viewed and/or selected portion of the process control system 102. In other examples, the status rollup processor 102 may display a status rollup for multiple selected and/or displayed portions of a process control system or, alternatively, may display a status rollup for multiple selected and/or displayed process control systems.

Additionally, the status rollup processor 102 may calculate a status factor and/or a process factor based on the information within a status rollup. A status factor may be a numerical representation that is based on a compilation of a number, a severity, a priority, and/or types of status issues within a status rollup. A status factor may include a summary, a safety summary, an availability summary, and/or a reliability summary of the at least one issue associated with the selected status type. Further, an operator may use a status factor to determine a safety level of the process control system 104 that may correspond to when components within the process control system 104 may need to be calibrated, fixed, and/or deactivated.

The process factor may be a numerical representation that provides a quality rating associated with an output of the process control system 104 that is based on a compilation of a number, a severity, a priority, and/or types of status issues within a status rollup. The process factor may include a summary, a safety summary, an availability summary, or a reliability summary of the at least one status factor. An operator may use the process factor to determine when to modify the process control system 104 to ensure the process remains within specified conditions.

Furthermore, the status rollup processor 102 enables an operator to determine status issues within portions of the process control system 104 by highlighting components associated with a status issue within a corresponding process control schematic displayed within the workstation 106. Upon receiving a selection from an operator, the status rollup processor 102 may conceal, darken, or obscure the un-selected portions of the process control system 104 within the schematic while leaving the selected portions un-concealed, un-darkened, and/or un-obscured within the schematic.

Additionally, the example status rollup processor 102 of FIG. 1 may manage status rollups based on a selected time and/or time period. For example, a process control operator may select a time. Upon receiving the selected time, the status rollup processor 102 displays within the user interface 120 a schematic of the process control system 104 and a corresponding status rollup indicating status issues associated with the process control system 104 at the selected time. In another example, an operator may select a time period. The status rollup processor 102 displays a schematic of the process control system 104 and a corresponding status rollup indicating any status issues that occurred during the specified period of time. In other examples, an operator may select a time and/or a time period and a portion of the process control system 104.

The example process control environment 100 is provided to illustrate one type of system within which the example methods and apparatus described in greater detail below may be advantageously employed. However, the example methods and apparatus described herein may, if desired, be advantageously employed in other systems of greater or less complexity than the example process control environment 100 and/or the process control system 104 shown in FIG. 1 and/or systems that are used in connection with process control activities, enterprise management activities, communication activities, etc.

Figure 2:
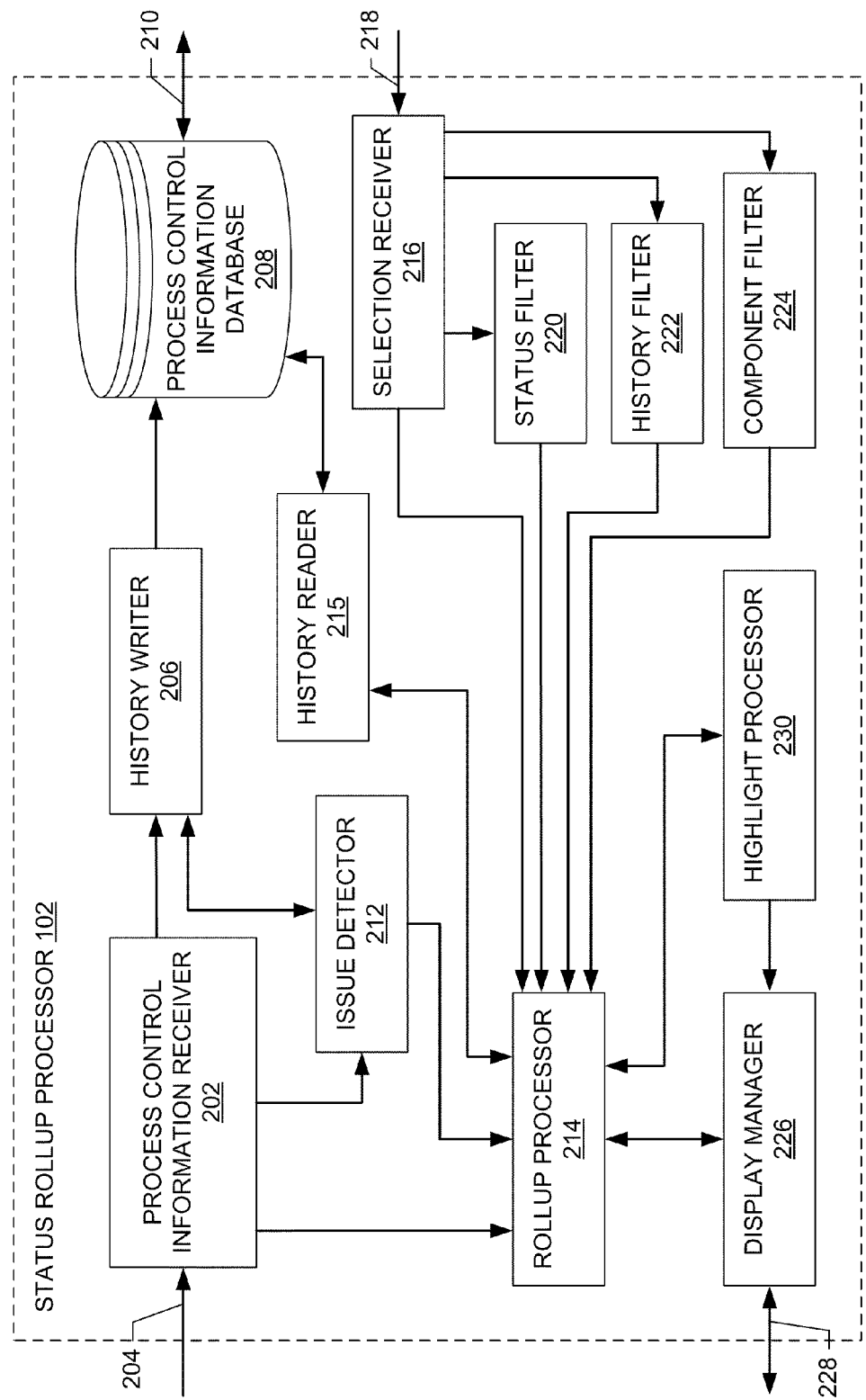
FIG. 2 shows a functional block diagram of the example status rollup processor of FIG. 1.

FIG. 2 is a functional block diagram of the example status rollup processor 102 of FIG. 1. The example status rollup processor 102 includes functional blocks for receiving process control information, detecting status issues, managing the storage of process control data and/or status issues, managing the display of status rollups, and/or highlighting portions of a schematic based on selection(s) of status issue(s). While the example status rollup processor 102 includes functional blocks configured to execute processes, the status rollup processor 102 may combine functional blocks or include additional functional blocks. In some examples, the status rollup processor 102 may be associated with a single process control system (e.g., the process control system 104) while in other examples the status rollup processor 102 may manage status rollups for a plurality of process control systems.

To receive process control information, the example status rollup processor 102 includes a process control information receiver 202. The example process control information receiver 202 may monitor the workstation 106, the LAN 110, and/or the controller 108 of FIG. 1 to detect communications of process control information. Upon detecting process control information, the process control information receiver 202 may format, filter, and/or parse the process control information by component identifiers (e.g., field device and/or a portion of the process control system) and/or any other type of identification information. The process control information receiver 202 may receive and/or detect process control information via a communication path 204 that may include any type of wired and/or wireless communication path.

In some examples, the process control information receiver 202 may receive any type of process control information. Alternatively, the process control information receiver 202 may receive only process control information that corresponds to a displayed and/or selected portion of a process control system. Further, the process control information receiver 202 may timestamp received process control data. Upon filtering, formatting, and/or parsing the process control information, the example process control information receiver 202 forwards the process control information to a history writer 206.

The example history writer 206 of FIG. 2 stores process control information to a process control information database 208. The process control information may be organized and/or stored in the database 208 based on a time the information was timestamped. In examples where the process control information receiver 202 does not timestamp the process control data, the history writer 206 may timestamp the information by a time the information was received and/or by a time the information was stored. Additionally or alternatively, the example history writer 206 may store the process control information based on component identifiers, status type, and/or portions of the process control system.

The process control information database 208 may be implemented by Electronically Erasable Programmable Read-Only Memory (EEPROM), Random Access Memory (RAM), Read-Only Memory (ROM), and/or any other type of memory. Further, the stored process control information may be accessed, modified, and/or deleted by a process control operator and/or engineer via a communication path 210. The example communication path 210 may be implemented by any type of wired and/or wireless communication path.

In addition to forwarding process control information for storage, the example process control information receiver 202 of FIG. 2 forwards filtered, formatted, and/or parsed process control information to an issue detector 212 to determine and/or identify status issues, diagnostics, message information, monitoring information, and/or alarm information. The issue detector 212 may monitor header information within the process control information to identify a status issue, diagnostic information, monitoring information, message information, and/or alarm information. For example, a process control header may identify a message and/or process control information as being a diagnostic message, an alarm, a fault indication, a calibration issue, a field device failure, and/or any other process control status type. Further, the issue detector 212 may identify process control routine issues (e.g., issues associated with the controller 108) based on status issue messages and/or diagnostic messages generated by a process control routine. For example, a process control routine operating within the controller 108 may send an error message when the routine becomes stuck on one or more instructions. In other examples, the routine may send an error message when the routine incorrectly skips and/or repeats instructions.

Alternatively, in examples where the process control information may not include header information, the issue detector 212 may monitor the process control information to determine if any of the data within the information exceeds one or more predefined thresholds. If some of the process control information exceeds a threshold, the issue detector may identify a component and/or a portion of a process control system that originated the deviation and determine a status type, diagnostic, alarm, etc. based on the identification.

Upon detecting a status issue, a diagnostic, alarm information, monitoring information, and/or message information, the issue detector 212 may determine a priority and/or a severity associated with the status issue, the diagnostic, the alarm information, the monitoring information, and/or the message information. The priority and/or severity information may be included within a header of the process control information and/or within a body of a message of the process control information. The issue detector 212 may then forward the detected status issues, diagnostics, alarm information, monitoring information, and/or message information and any associated priority and/or severity ratings to the history writer 206 for storage in the process control information database 208. The issue detector 212 may also forward to the history writer 206 information relating to components and/or portions of the process control system that are associated with each of the status issues, diagnostics, monitoring information, alarm information, and/or message information. Additionally, the issue detector 212 may forward status issues, diagnostics, monitoring information, alarm information, message information, and/or any corresponding process control information to a rollup processor 214.

The example rollup processor 214 receives status issues, diagnostics, alarm information, monitoring information, and/or message information from the issue detector 212 and process control information from the process control information receiver 202. The rollup processor 214 may link the status issues, diagnostics, monitoring information, alarm information, and/or message information to the received corresponding process control information. In some examples, the rollup processor 214 may determine a priority and/or a severity of status issues, diagnostics, monitoring information, alarm information, message information based on the process control information.

Further, the example rollup processor 214 may receive a selection of a status type, component type, and/or a portion of a process control system from an operator and/or engineer. Upon receiving such a selection, the rollup processor 214 may filter and/or parse status issues, diagnostics, monitoring information, alarm information, message information and the corresponding process control information by the selection. For example, upon receiving a selection of a component type (e.g., a field device type, a process control area, etc.), the rollup processor 214 determines if any of the received process control information and/or identified status issues, diagnostics, monitoring information, alarm information, and/or message information is associated with the selected component type. Likewise, upon receiving a selection of a status type, the rollup processor 214 determines if any of the received process control information and/or identified status issues, diagnostics, monitoring information, alarm information, and/or message information is associated with the selected status type.

Upon filtering and/or parsing the process control information and/or identified status issues, diagnostic messages, alarm information, and/or message information, the rollup processor 214 may compile the status issues, diagnostic messages, alarm information, and/or message information. The rollup processor 214 may compile the status issues, diagnostic messages, alarm information, and/or message information by counting the number of instances of each item. Further, the rollup processor 214 may organize the filtered status issues, diagnostic messages, alarm information, and/or message information by severity, priority and/or sub-type. The rollup processor 214 may then organize the compiled items within a status rollup that may be displayed within a user interface (e.g., the user interface 120).

Alternatively, the rollup processor 214 may compile, count, and/or organize the status issues, diagnostic messages, alarm information, and/or message information into a status rollup prior to receiving a selection of a status type, component type, and/or portion of a process control system. Then, upon receiving a selection, the rollup processor 214 may determine which items within the status rollup are associated with the selection and remove the items from the status rollup that are not associated with the selection.

By filtering and/or parsing the process control information and/or the status issues, diagnostic messages, alarm information, and/or message information based on a selection of a component type, status type, and/or a portion of a process control system, the example rollup processor 214 manages which status issues, diagnostic messages, alarm information, and/or message information are displayed within a status rollup based on the selection. For example, if an operator selects a portion of a process control system, the rollup processor 214 uses this selection to filter the process control information and/or any detected status issues, diagnostic messages, alarm information, and/or message information for display in a status rollup. As the rollup processor 214 receives selections of different portions of the process control system, the rollup processor 214 automatically updates the status rollup based on the selections. Thus, as an operator changes a displayed portion, the rollup processor 214 ensures the displayed status rollup includes only process control information and/or status issues, diagnostic messages, alarm information, and/or message information that correspond to the displayed and/or selected portion. In examples where an operator may be viewing multiple user interfaces of different portions of process control systems, the rollup processor 214 may manage the display of a status rollup for each displayed portion.

Further, upon creating a status rollup, the example rollup processor 214 may calculate a status factor and/or a process factor for each of the status issues, diagnostic messages, alarm information, and/or message information within the status rollup. The rollup processor 214 then forwards the status factor and/or the process factor for display within a user interface adjacent to the status rollup. In some examples, the rollup processor 214 may use a status factor to calculate a process factor.

In addition to managing a summary of status issues, diagnostic messages, alarm information, and/or message information within a status rollup, the example rollup processor 214 may manage the display of process control information for each selected type of status issue, diagnostic message, alarm information, and/or message information. For example, an operator may select a failed field device status type. Upon receiving the selection, the rollup processor 214 may create a display within a user interface for any detected status issues associated with the failed field device status type. Further, the rollup processor 214 may determine any process control information that may be associated with each of the failed field device status issues.

The rollup processor 214 may then display each failed field device status issue and the corresponding process control information in a status rollup. This status rollup may provide enough information for an operator to determine a cause for each of the listed failed field devices. The process control information that may be displayed within a status rollup includes, for example, a description of the issue, a device status description associated with the issue, a frequency of the issue, a date of occurrence of the issue, a time of occurrence of the issue, an operating mode of the issue, an operator description of the issue, a location of the issue, an identifier associated with the issue, at least one mitigation action for the issue, and/or any other relevant process control information.

In some examples, the rollup processor 214 may receive a selection to view a schematic and/or process control information associated with a specified time and/or time period. Upon receiving a request to view a time and/or a time period, the rollup processor 214 instructs a history reader 215 to retrieve process control information and any associated status issues, diagnostics, alarm information, and/or message information from the process control information database 208. The history reader 215 receives the instruction from the rollup processor 214 and accesses the process control information database 208 to retrieve the process control information and/or status issues, diagnostic messages, alarm information, and/or message information associated with the selected time and/or time period based on the timestamped information. The history reader 215 then forwards the information to the rollup processor 214.

Upon receiving the information, the rollup processor 214 creates a status rollup for the selected time and/or time period of any selected and/or displayed component, status issue, and/or portion of a process control system. The rollup processor 214 filters the received information from the history reader 215 to construct a status rollup in the same manner as the rollup processor 214 filters and constructs status rollups from real time process control information received from the process control information receiver 202 and/or the issue detector 212. Additionally, in examples where an operator may select a function to display changes to a process control system over a time period, the rollup processor 214 may request process control information for multiple times within the time period from the history reader 215.

To receive selections from a process control operator and/or engineer, the example status rollup processor 102 of FIG. 2 includes a selection receiver 216. The example selection receiver 216 may receive selections via a communication path 218 that may include any wired and/or wireless communication path to a workstation (e.g., the workstation 106 of FIG. 1). The selection receiver 216 may receive a selection of a status type, a sub-status type, a process control component type, a portion of a process control system, a time, a time period, and/or a selection of a highlight function.

Upon receiving a selection, the selection receiver 216 determines a type of selection and forwards the selection to an appropriate location. For example, a highlight function selection may be forwarded to the rollup processor 214. Additionally, a status type selection may be forwarded to a status filter 220, a time selection and/or a time period selection may be forwarded to a history filter 222, and a component type selection may be forwarded to a component filter 224. The selection receiver 216 may determine a selection type based upon information within a message that included the selection.

The example status filter 220 of FIG. 2 receives a selection of a status type from the selection receiver 216 and determines the status type. An operator may select a status type within a user interface (e.g., the user interface 120) that displays a schematic and/or any other type of process control information that may be used to graphically represent a process control system. The status types may be listed within a menu, may be displayed as icons, may be displayed in a list, etc. The status type may include alarms, messages, simulations, field device issues, field device conditions, abnormal conditions, knowledge available conditions, field device maintenance conditions, field device status conditions, control (e.g., process control routine and/or algorithm) issue conditions, configuration errors, altered alarms, action requests, altered field devices, control bypasses, process control routines with improper modes, process control routines with issues, alarms with issues, and/or any user defined conditions. The status filter 220 may include a list of possible status types and corresponding identifiers that may be specified by a process control engineer. Further, the engineer may update the list as new status types are specified and/or defined. The status filter 220 may determine the status type based on an identifier within a status type selection by an operator. The status filter 220 may then cross-reference the identifier to a status type.

In some examples, the status filter 220 may be included within the rollup processor 214. In these examples the status filter 220 may filter process control information and/or status issues by the selected status type. In examples where the status filter 220 is separate from the rollup processor 214, the status filter 220 may forward the determined status type to the rollup processor 214 to filter process control information by the selected status type. Further, the status filter 220 may determine a sub-status type that may be selected by an operator and forward the sub-status type to the rollup processor 214.

The example history filter 222 of FIG. 2 receives selections of a time and/or a time period from the selection receiver 216. A time and/or a time period may include a date, a year, a month, a day, an hour, a minute, a second, etc. Upon receiving the time and/or the time period, the history filter 222 determines the time and/or the time period from the selection instruction and forwards the determined time and/or time period to the rollup processor 214. In examples where the history filter 222 may receive a selection of an operator shift and/or of any other type of specific time period, the history filter 222 may determine the times associated with the operator shift and forward those times to the rollup processor 214. The work schedules and/or other definitions of time periods may be stored to the history filter 222 by a process control engineer. Alternatively, the history filter 222 may access a database (not shown) that includes the work schedules and/or other definitions of time periods.

For example, the history filter 222 may receive a selection of a time period corresponding to the shift of operator MF01 on the date Sep. 11, 2009. Upon receiving this selection, the history filter 222 may access a work schedule to determine that MF01 worked from 8:05 A.M. until 7:32 P.M. on Sep. 11, 2009. The history filter 222 may then forward the time period from 8:05 A.M. until 7:32 P.M. on Sep. 11, 2009 to the rollup processor 214 to retrieve the process control information, status issues, diagnostics, etc. associated with that time period.

In examples where the example history filter 222 may receive a sequence of times (e.g., a movie mode on a schematic), the history filter 222 may transmit each individual time for a status rollup to be displayed. Alternatively, the history filter 222 may forward the entire time sequence to the rollup processor 214, enabling the rollup processor 214 to create status rollups for each time in the sequence and display the status rollup at the appropriate time.

In some examples, the history filter 222 may forward the time and/or the time period to the history reader 215. Upon receiving the time and/or the time period, the history filter 215 may retrieve the corresponding information and forward the information to the rollup processor 214. In yet other examples, the history filter 222 may be included within the rollup processor 214.

The example component filter 224 of FIG. 2 receives selections of component types from the selection receiver 216 and determines the component type from within the selection message. A component type may be selected by an operator via a user interface that may be displaying a schematic, functional block diagram, and/or any other graphical or numerical representation of a process control system. For example, a component type may be selected via a menu, displayed icons, a list, etc.

The component filter 224 may determine component types including, for example a selection of a field device type, a selection of field devices, a selection of process control components, a selection of a process control unit of equipment, an area of field devices in the process control system, a process control area, an area of control of an operator, a batch area, field devices associated with a batch process, or a display area of a schematic. A process control engineer may add, remove, and/or modify component types that be stored and/or accessed by the component filter 224. The component filter 224 may identify a tag and/or identifier associated with field devices and/or other process control components that the rollup processor 214 may use to cross-reference to process control information associated with a process control system.

In examples where the component filter 224 receives selections of a portion of a process control system, the component filter 224 may determine field devices and/or any other process control components that may be included within the selected portion. The component filter 224 then forwards those determined field devices and/or components to the rollup processor 214. The example component filter 224 may determine which field devices correspond to a selected portion of a process control system by accessing the selected portion within a schematic, functional block diagram, etc. and identifying the field devices and/or components within the selection.

In some examples, a user interface may tag displayed and/or selected field devices and/or components as being selected. Specifically, a field device may have a tag that indicates it is currently being viewed. In these examples, the component filter 224 identifies the selected field devices and/or components by the tag. In other examples, the component filter 224 may receive a screen shot of a schematic of a selected portion of a process control system. In these examples, the component filter 224 may utilize text searching algorithms to identify identifiers associated with the field devices and/or other process control components that are included within the screen shot.

Upon determining a selected component type and associated field devices that may be included within the selected component type, the example component filter 224 forwards the component type and associated identifiers of the field devices to the rollup processor 214. Alternatively, in some examples, the component filter 224 may be included within the rollup processor 214. In these examples, the component filter 224 may also filter process control information and/or status issues by a selected component type.

To format status rollups created by the rollup processor 214 for display, the example status rollup processor 102 of FIG. 2 includes a display manager 226. The example display manager 226 receives status rollup information and converts the information into graphic display information for display within a user interface (e.g., the user interface 120). The display manager 226 may transmit the graphic display information to a user interface via a communication path 228 that may include any wired and/or wires communication path coupled to a workstation (e.g., the workstation 106).

The example display manager 226 may format the status rollup information into a table, list, and/or any other type of graphical representation. Further, the display manager 226 may display icons to represent status types, component types, priorities, and/or severities. Additionally, the display manager 226 may display a number of each status type. The display manager 228 may also display a timer and/or a time selection function that enables an operator to select a time and/or a time period.

In some examples, the rollup processor 214 may receive a selection of a function to highlight status issues, diagnostics, monitoring information, alarm information, and/or message information within a displayed schematic. In these examples, the status rollup processor 102 of FIG. 2 includes a highlight processor 230 to manage a highlighting of a status issue. The highlight processor 230 may manage the highlighting of portions of a process control schematic, as described in U.S. patent application Ser. No. 12/275,016 which is hereby incorporated by reference in its entirety.

Upon receiving a selection of the highlight function and/or a selection of a status type, the rollup processor 214 forwards the highlight instruction, a component type, the status type, and/or any status issues associated with the status type to the highlight processor 230. The example highlight processor 230 determines the field devices and/or process control components that are included within a schematic or functional block diagram that are to be highlighted by the status type. The highlight processor 230 may then send instructions to the display manager 226 to shade, obscure, and/or darken portions of a schematic or functional block diagram that are not be highlighted. Additionally, the highlight processor 230 may send instructions to the display manager 226 to highlight the field devices and/or portions of a process control system displayed within a schematic or functional block diagram that correspond to a selected status type. Highlighting may include displaying a light or a flash around selected portions of the process control system within a schematic and/or a functional block diagram.

While an example manner of implementing the status rollup processor 102 is depicted in FIG. 2, one or more of the interfaces, data structures, elements, processes and/or devices illustrated in FIG. 2 may be combined, divided, rearranged, omitted, eliminated and/or implemented in any other way. For example, the example process control information receiver 202, the example history writer 206, the example issue detector 214, the example rollup processor 214, the example history reader 215, the example selection receiver 216, the example status filter 220, the example history filter 222, the example component filter 224, the example display manager 226, and/or the example highlight processor 230 illustrated in FIG. 2 may be implemented separately and/or in any combination using, for example, machine-accessible or readable instructions executed by one or more computing devices and/or computing platforms (e.g., the example processing platform P10 of FIG. 12).

Further, the example process control information receiver 202, the example history writer 206, the example issue detector 214, the example rollup processor 214, the example history reader 215, the example selection receiver 216, the example status filter 220, the example history filter 222, the example component filter 224, the example display manager 226, the example highlight processor 230, and/or more generally, the status rollup processor 102 may be implemented by hardware, software, firmware and/or any combination of hardware, software and/or firmware. Thus, for example, any of the example process control information receiver 202, the example history writer 206, the example issue detector 214, the example rollup processor 214, the example history reader 215, the example selection receiver 216, the example status filter 220, the example history filter 222, the example component filter 224, the example display manager 226, the example highlight processor 230, and/or more generally, the status rollup processor 102 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 3A:
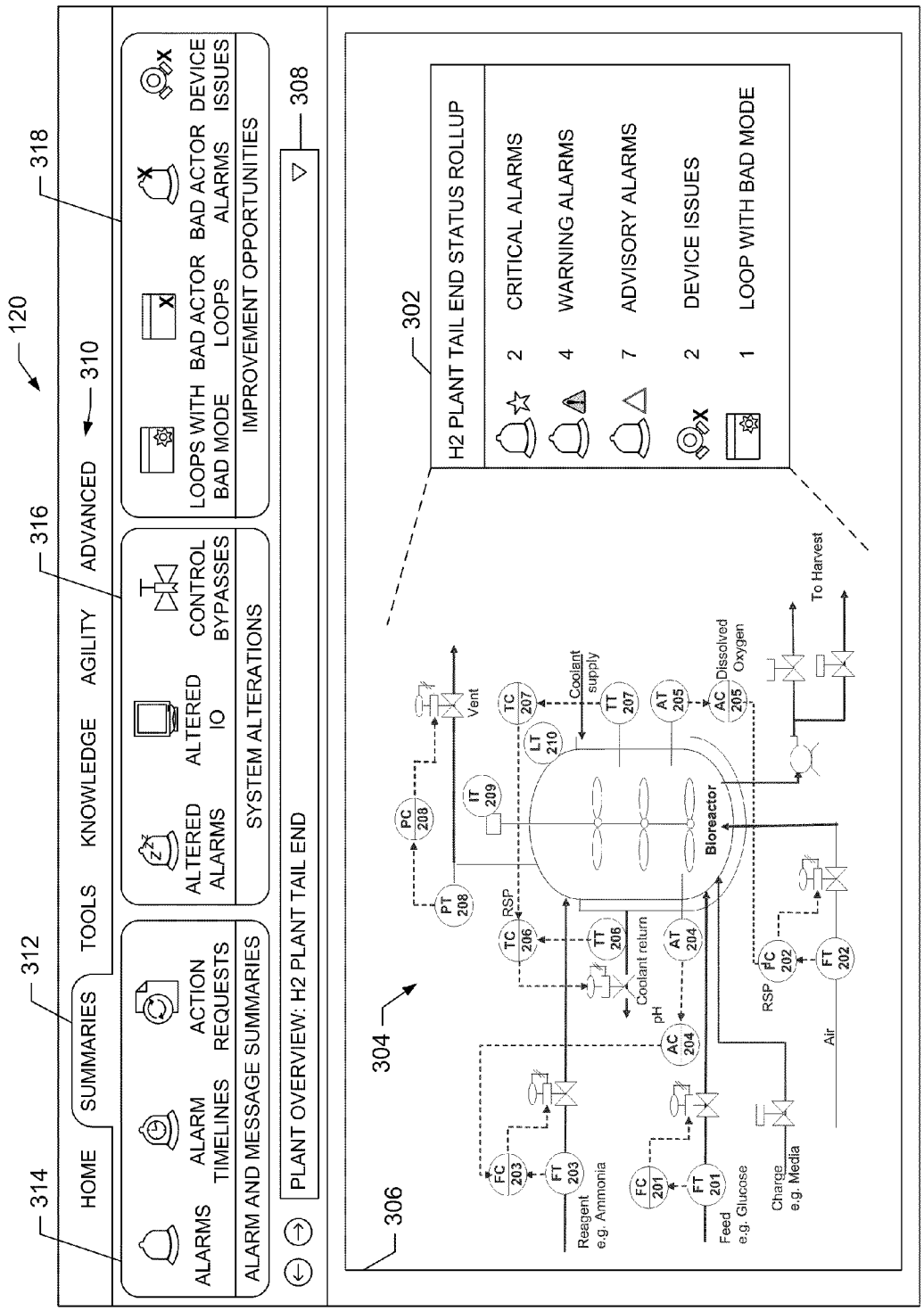
FIG. 3A shows a user interface displaying the process control system of FIG. 1 and a corresponding status rollup.

FIG. 3A shows the user interface 120 of FIG. 1 with a status rollup 302 associated with a schematic 304. The example schematic 304 represents the field devices 112 of FIG. 1 (e.g., a component type). In other examples, the user interface 120 may display a schematic of other field deices, process control systems, and/or portions of a process control system. In yet other examples, the user interface 120 may display a functional block diagram and/or any other type of a graphical and/or data representation associated with a process control system. The example status rollup 302 shows status issues associated with the displayed schematic 304 (e.g., component type).

The example status rollup 302 and the schematic 304 are included within a display area 306. The display area 306 may be specified by a component type bar 308. The example component type bar 308 of FIG. 3A indicates that the display area 306 shows a Plant Overview of the H2 Plant Tail End portion of the H2 process control system (e.g., the process control system 104). Other component types may be selected within the component type bar 308 by selecting any one of the arrows adjacent to the bar 308. In other examples, a component type may be selected from a menu, a list, icons, etc. In this example, an operator may have selected the H2 Plant Tail End from the component type bar 308. Upon receiving the selection, the status rollup processor 102 of FIGS. 1 and 2 generated and displayed the status rollup 302 adjacent to the schematic 304.

Additionally, the example user interface 120 of FIG. 3A includes a menu bar 310 that enables an operator to select from a list of possible features and/or functions associated with the display of information associated with the field devices 112. In this example, a Summaries menu item 312 is selected showing status issue types (e.g., status type) depicted as icons. In other examples, the status types may be selectable from a menu, list, etc.

The example Summaries menu item 312 includes status type icons included within an Alarm and Message Summaries Group 314, a System Alterations Group 316, and an Improvement Opportunities Group 318. In other examples, status type icons may be arranged by other groups and/or may be displayed without being associated with a group. The example Alarm and Message Summaries Group 314 include status issue types that include alarm and message information. The Alarm and Message Summaries Group 314 includes Alarms (e.g., active alarm, suppressed alarm, alarm acknowledgment, etc.), Alarm Timelines, and Action Requests (e.g., operator messages sent by a process control routine, operators, and/or external applications). The System Alterations Group 316 includes status issues that specify any changes or modifications to a process control system. The Improvement Opportunities Group 318 includes status issue types that specify issues, abnormal conditions, and/or failures associated with a process control routine (e.g., Loop) and/or field devices. The Summaries menu item 312 may include other status issue types including simulation information, operator notes, field device maintenance or advisory alerts, field device maintenance requests, improper I/O to a field device, improper signal status from a field device, critical field device alerts, field device powering up alerts, field device readback failures, field device non-volatile data failures, static data failures, memory failures, output failures, high process variability issues, process tuning issues, process oscillation issues, process interlocks, process bypasses, process permissives, process force actions, process modelocks, process overrides, improper process modes, limited process outputs, uncertain process inputs, suspect process valves, stale indications, link configuration errors, input transfer errors, output transfer errors, alarm processing errors, unresolved datalinks, communication issues within a dataserver, unresolved references, process fault state active alerts, routine execution overloads, routine forced value issues, process input bypass active issues, process input startup override active issues, process input bypass expiration imminent issues, process input tripped issues, process input deviations, demands to trip a process input issues, process output demand overridden issues, process output tripped issues, process debug active views, component disabled issues, component errors, out of service component issues, routine breakpoint set issues, etc.

The example status rollup 302 shows status issues associated with the Alarms status type (e.g., the first three lines within the status rollup 302), the Device Issues status type (e.g., the fourth line within the status rollup 302), and Loops within Bad Mode status type (e.g., the fifth line within the status rollup 302). Further, the icons within the status rollup 302 correspond to the status issue types displayed within the Summaries menu item 312.

Additionally, the Alarms status type is subdivided by a severity of the alarms as indicated by icons adjacent to the bell icon. For example, the star icon in the first line of the status rollup 302 may indicate there are two critical alarms, the warning icon in the second line of the status rollup 302 may indicate there are three warning alarms, and the triangle icon in the third line of the status rollup 302 may indicate there are seven advisory alarms. In other examples, the status rollup 302 may display other status issue types, other sub-issue status types, and/or different amounts of status issues associated with each status issue type. Further, the schematic 304 may display an indication corresponding to a location within the schematic 304 for each status issue displayed within the status rollup 302.

An operator may view the status rollup 302 and relatively quickly determine the number and severities of alarms within the displayed schematic 304. Further, the operator may select any of the status issue types within the status rollup 302 to view more detailed information for each status issue associated with the selected status issue type. Additionally, the operator may zoom into a portion of the schematic 304. Upon zooming into the portion around the Bioreactor, for example, the status rollup 302 automatically displays status issues associated with the zoomed-in portion. Specifically, the status rollup 302 may only show 1 Critical Alarm, 2 Warning Alarms, and 1 Loop with Bad Mode. In another example, the operator may select another portion of the H2 Plant (e.g., the Middle). Upon receiving the selection, the status rollup processor 102 displays the status rollup 302 to show status issues associated with the H2 Plant Middle.

Figure 3B:
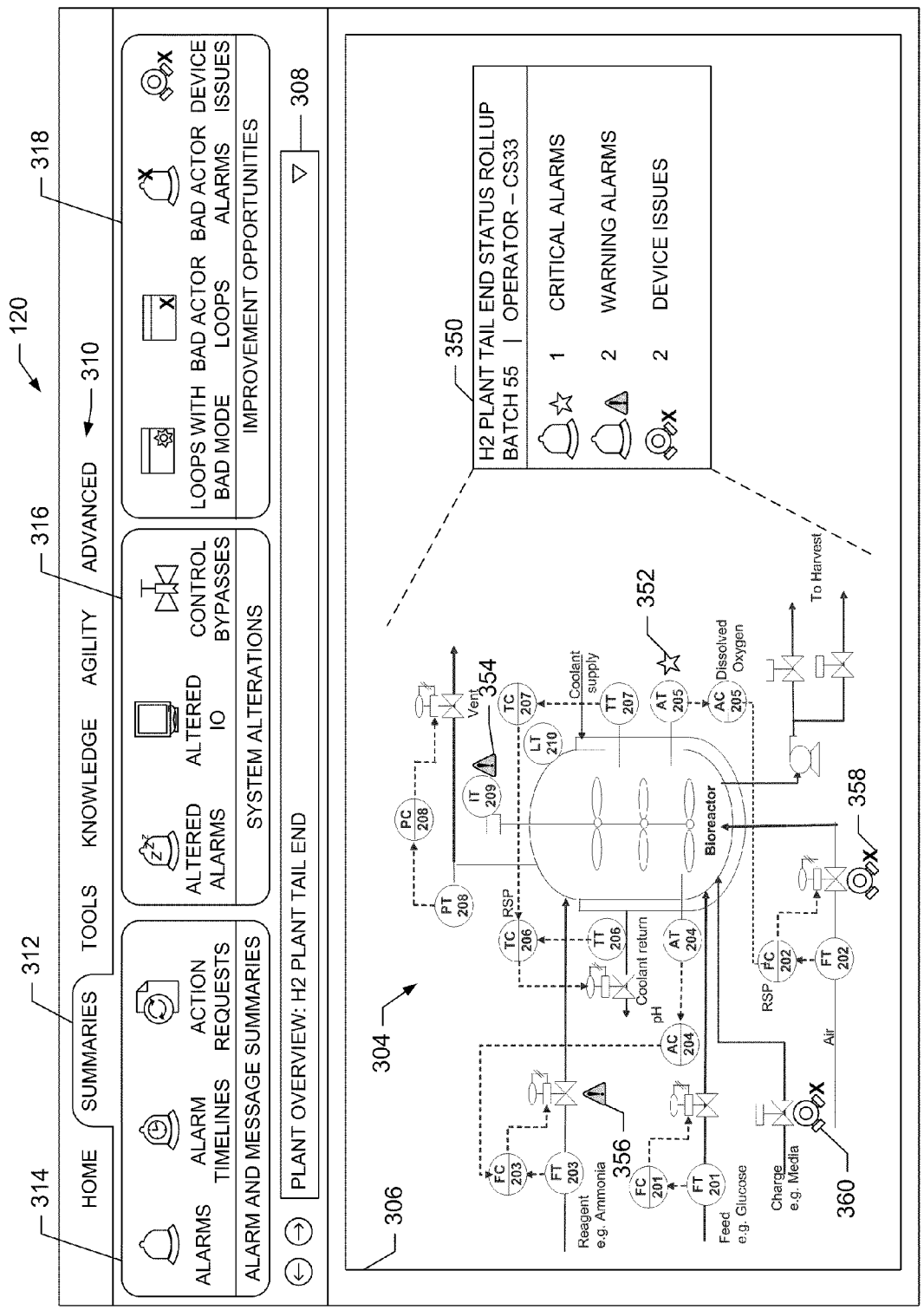
FIG. 3B shows the example user interface of FIG. 3A displaying the process control system of FIG. 1 and a corresponding status rollup corresponding to an operator and a batch.

FIG. 3B shows the user interface 120 of FIG. 3 with a status rollup 350 associated with the schematic 304. Further, the status rollup 350 shows status issues that correspond to a selected component type (e.g., Batch 55) and a selected operator (e.g., CS33). Upon receiving the selected component type and operator, the status rollup processor 102 of FIGS. 1 and/or 2 determines which of the status issues listed in the status rollup 302 of FIG. 3A are associated with the Batch 55 component type and the CS33 operator. The rollup processor 102 then displays the corresponding status issues within the status rollup 350. In other words, only some of the status issues in the status rollup 302 of FIG. 3 may be associated with the Batch 55. For example, a critical alarm may only have been active during the Batch 55.

Additionally, the status issues within the status rollup 350 correspond to status issues within the schematic 304 that may be under the control of the operator CS33. In other examples, status issues may be filtered by a priority and/or a severity, a group of tags (e.g., identification values of components) specified by an operator, a type of an operator, and/or a job category of an operator. The group of tags may include a set of field devices within a particular area of the schematic 304, components associated with a particular functional block (e.g., a functional block associated with the schematic 304), and/or components associated with a particular process control area (e.g., the process control system 104 of FIG. 1).

The example user interface 120 of FIG. 3B includes indicators 352-360 that display within the schematic 304 the locations of the status issues within the status rollup 350. For example, the critical alarm status issue within the status rollup 350 corresponds to the critical alarm indicator 352 adjacent to the AT 205 component. The CS33 operator may use these indicators 352-360 to relatively quickly locate and/or determine a cause of a status issue. The indicators 352-360 may be displayed as graphical representations corresponding to status issues including, but not limited to, static icons, animated icons, text, audio alerts, etc. In other examples, the indicators 352-360 may include tags, status information, and/or process control information.

Figure 4:
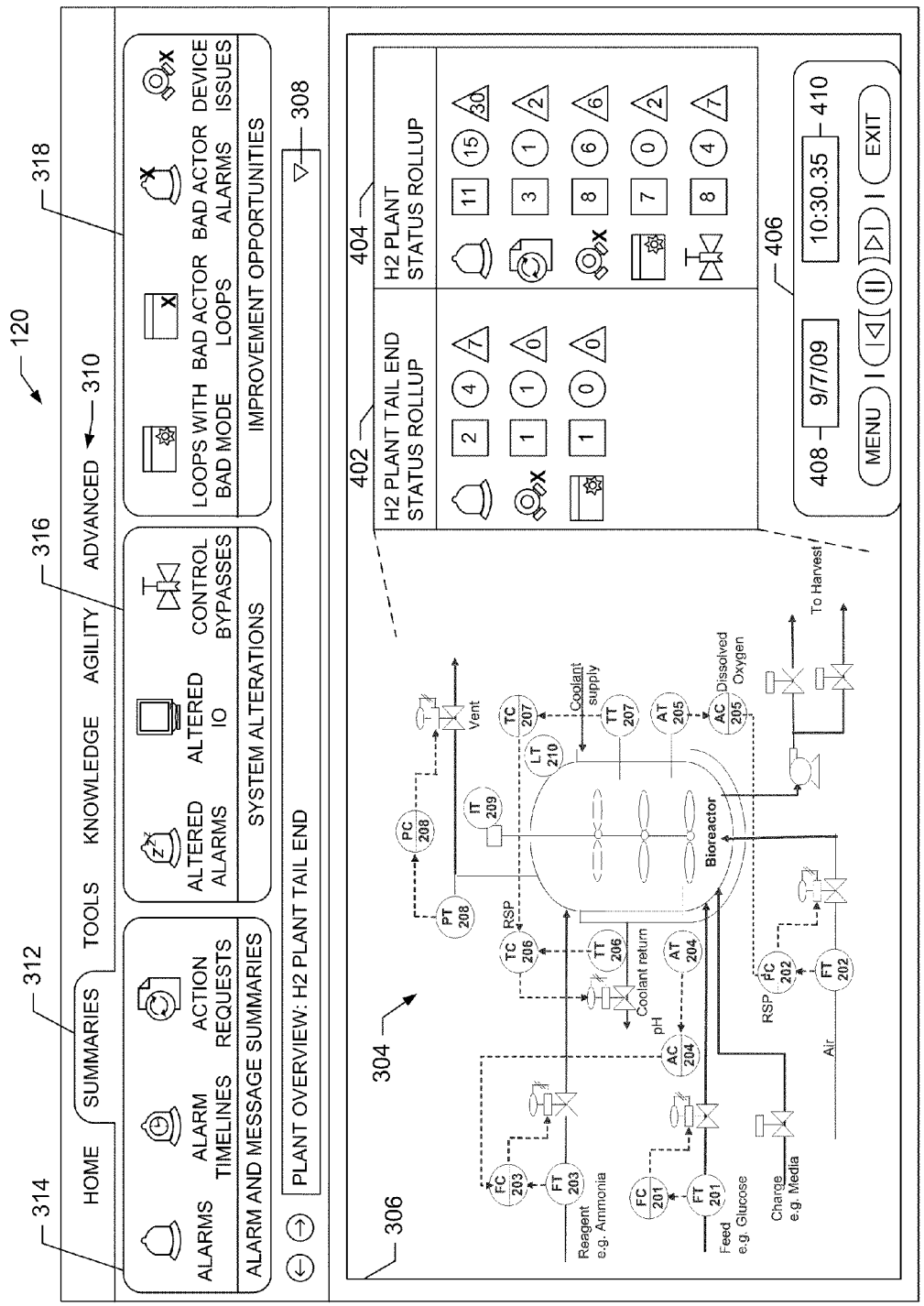
FIG. 4 shows the example user interface of FIG. 3A including another status rollup.

FIG. 4 shows the example user interface 120 of FIG. 3A including another status rollup 402. The status rollup 402 shows an alternative implementation of the status rollup 302 of FIG. 3A. Further, the example user interface 120 includes the schematic 304, the display area 306, the component type bar 308, the menu bar 310, the Summaries menu item 312, the Alarm and Message Summaries Group 314, the System Alterations Group 316, and the Improvement Opportunities Group 318 of FIG. 3A.

The example status rollup 402 of FIG. 4 includes the same status issues as the status rollup 302. However, the status issue information is displayed by status type and severity. For example, the first line of the status rollup 402 includes a summary of status issues associated with the Alarms status type. The status issues within the Alarms status type of the status rollup 402 are organized by severity, with the square icon corresponding to the critical alarms within the status rollup 302 of FIG. 3A. Further, the circle icon in the Alarms status type of the status rollup 402 corresponds to the warning alarms within the status rollup 302 and the triangle in the status rollup 402 corresponds to the advisory alarms within the status rollup 302. Additionally, the Device Issues status type and the Loops With Bad Mode status type are organized by severity.

In addition to the status rollup 402, the user interface 120 of FIG. 4 includes a high level status rollup 404 that displays status issues for the entire H2 plant. The status issues within the high level status rollup 404 may include status issues within the status rollup 402 in addition to status issues associated with other portions of the H2 Plant. The high level status rollup 404 provides a hierarchical display of status issues such that an operator may view a status of a complete process control system while viewing a portion of the process control system. In other examples, the high level status rollup 404 may display status issues associated with a portion of the process control system adjacent to the field devices 112 viewed within the schematic 304. The status rollup processor 102 may manage the high level status rollup 404 by maintaining a status rollup for an entire process control system and/or significant areas of a process control system even as an operator selects a portion of the process control area.

The example user interface 120 of FIG. 4 includes a history selector 406. The history selector 406 enables an operator to select a time and/or a time period to view status issues and/or process control information. The history selector includes a date selector 408 and a time selector 410. Further, the history selector 406 includes navigation buttons that enable an operator to view the field devices 112 within the schematic 304 over a period of time (e.g., a movie mode). Further, the history selector 406 may include functionally that enables an operator to select an operator shift and/or any other defined time period.

Upon selecting a date and/or time, the user interface 120 may display within the schematic 304 a state of the field devices 112 at the selected time and/or time period. Further, the status rollups 402 and 404 display a summary of the status issues associated with the viewed schematic 304 at the selected time and/or time period. Displaying a state of the field devices 112 may include displaying input and/or output information associated with each field device represented by the schematic 304, messages associated with the field devices 112, issues associated with the field devices 112, diagnostics associated with the field devices, etc.

By selecting a time and/or date, the history selector 406 enables an operator to view a past state of the field devices 112 to determine a cause of any possible issues. Further, in examples where a process produces an out of specification product, an operator may use the history selector 406 to determine if a combination of issues and/or a sequence of issues was a cause of the deviation.

Additionally, the user interface 120 may include in the display area 306 a status factor and/or a process factor calculated based on the status issues within the status rollup 402 and/or the high level status rollup 404. While the status rollups 402 and 404 and the history indicator 406 are shown in the display area 306, the status rollups 402 and 404 and/or the history selector 406 may be included within any part of the user interface 120. Further, other example implementations may create status rollups that differ in appearance from the status rollups 402 and 404 but which display status issues and/or process control information associated with status issues within a status rollup.

Figure 5:
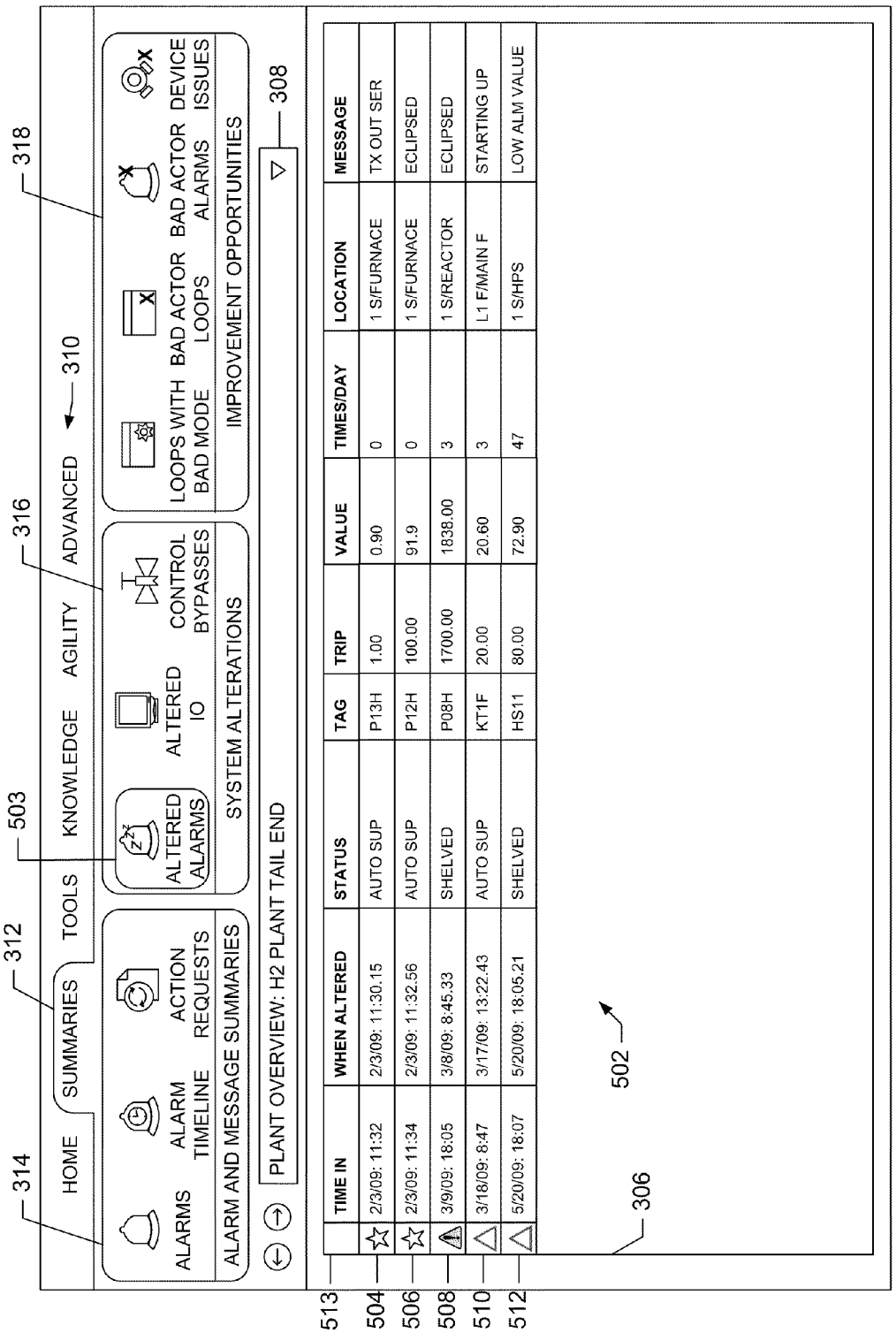
FIG. 5 shows the user interface of FIG. 1 including a rollup of status issues corresponding to the altered alarms status type associated with the process control system of FIGS. 1-3.
Figure 6:
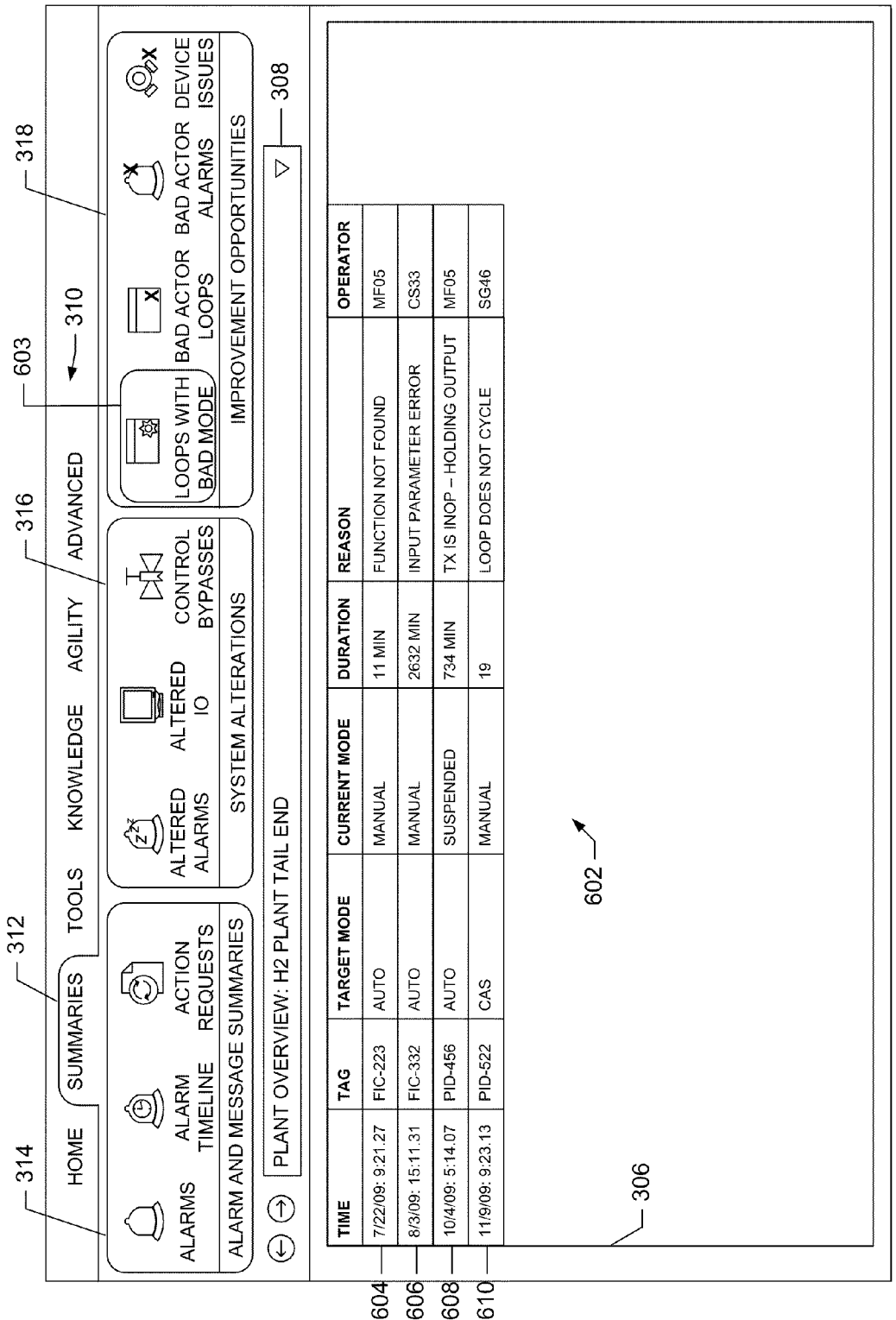
FIG. 6 shows the user interface of FIG. 1 including a rollup of status issues corresponding to the loops with a bad mode status type associated with the process control system of FIGS. 1-3.
Figure 7:
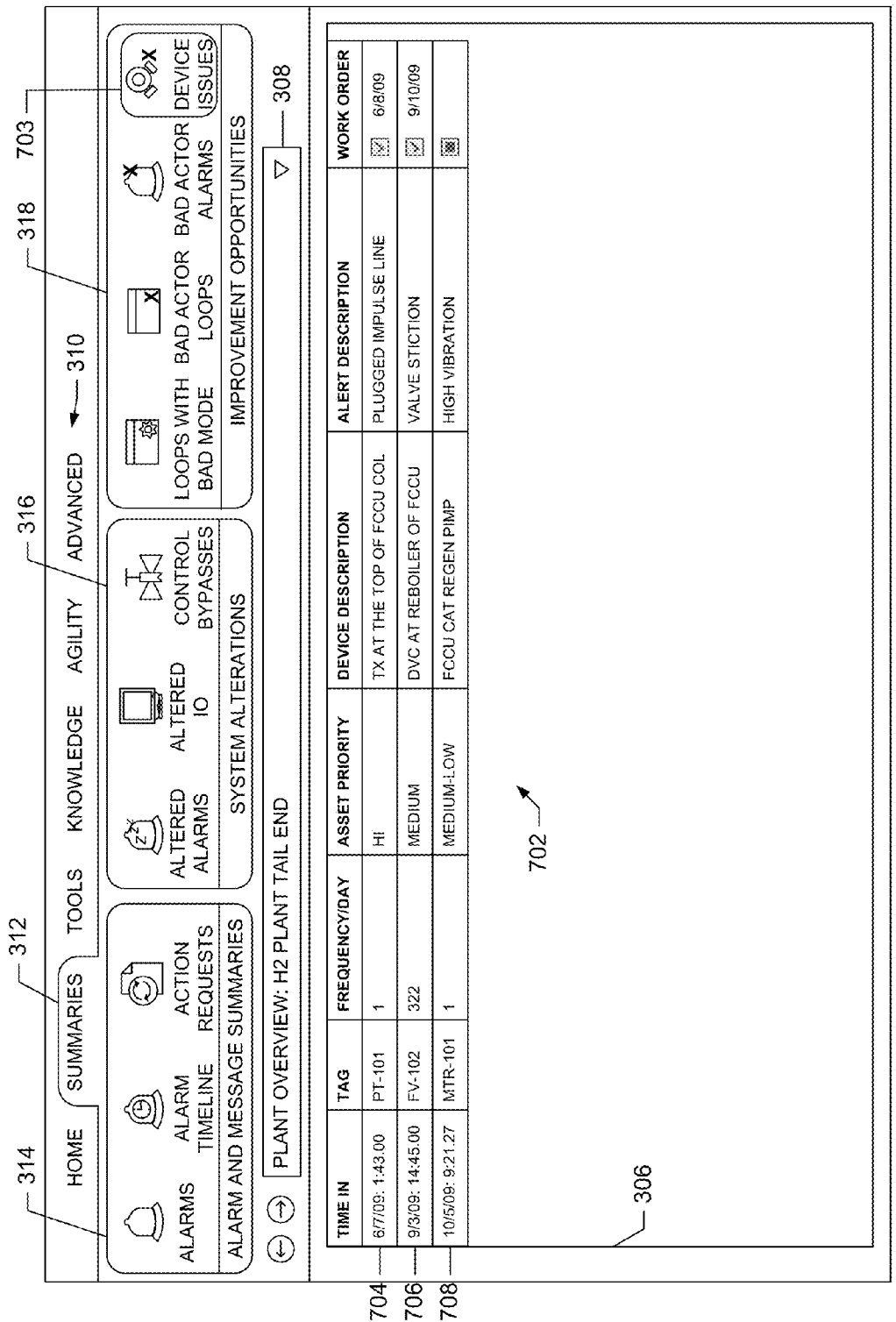
FIG. 7 shows the user interface of FIG. 1 including a rollup of status issues corresponding to the device issues status type associated with the process control system of FIGS. 1-3.

FIGS. 5-7 show the user interface 120 of FIG. 1 including respective status rollups 502, 602, and 702 of status issues corresponding to a respective status type associated with the process control system of FIGS. 1-3. The example user interface 120 of FIGS. 5-7 includes the display area 306, the component type bar 308, the menu bar 310, the Summaries menu item 312, the Alarm and Message Summaries Group 314, the System Alterations Group 316, and the Improvement Opportunities Group 318 of FIG. 3A. Additionally, while the schematic 304 is not shown in FIGS. 5-7, alternative implementations may include the schematic 304 within the display area 306.

FIG. 5 shows status issues within the status rollup 502 based on a selection by an operator of the Altered Alarms status type. The Altered Alarms status type may include alarms within the process control system 104 of FIG. 1 that may have been suppressed, shelved, modified, quieted, and/or removed from a normal operating state. A selection box 503 around the Altered Alarms icon within the System Alterations Group 316 indicates that the Altered Alarms status type was selected. In other examples, the Altered Alarms may be selected from a menu, a list of status issue types, etc.

The example status rollup 502 is displayed as a table that includes process control information associated with each status issue 504-512. In other examples, the status rollup 502 may include a summary of each status issue organized and/or arranged by a priority and/or a severity. The example status rollup 502 of FIG. 5 includes process control information fields for a time (e.g., Time In) when an alarm alteration was received by the status rollup processor (e.g., a timestamp), a time when an alarm was altered (e.g., When Altered), a current status of an alarm (e.g., Status), an identification value of an alarm (e.g., TAG), a value that an alarm monitors that is a threshold to when the alarm is activated (e.g., Trip), an average value that an alarms monitors that activated the alarm (e.g., Value), a number of times per day that an alarm is activated (e.g., Times/Day), a location of an alarm within the process control system 104 (e.g., location), and a message associated with an altered alarm (e.g., Message). Further, each row or line within the status rollup 502 includes a column 513 that indicates a priority and/or a severity of an alarm. Further, the status rollup 502 may include additional fields of process control information that may be related to an altered alarm or, alternatively, may include fewer fields.

In an example, the status issue 504 shows process control information associated with an altered alarm with an identification value of P13H. The process control information also shows that the status issue 504 associated with the altered alarm includes a critical priority (e.g., the star icon), was received at 11:32 on Feb. 3, 2009, was altered on Feb. 3, 2009 at 11:30.15, has a status of auto suppression, has a trip threshold of 1.00, has been activated by an average value of 0.90 with an average times per day trip rate of 0 and is located in the 1 S/Furnace region. The message, TX OUT SER may include a transmitter is out of service and may have been entered by a technician serving the alarm. An operator may view the process control information associated with the status issue 504 and determine that a replacement of the transmitter may solve the issue. Likewise, the status issue 512 shows a trip rate of 47 times a day with a message indicating the trip rate may be set too low. In this example, an operator and/or engineer may modify the trip rate to a new value to resolve the issue.

The status issues 504-512 within the status rollup 502 are status issues that are associated with a selected portion of the process control system 104 (e.g., H2 Plant Tail End). Also, the status issues 504-512 are associated with the selected Altered Alarms status type. Further, in some examples, a history timer (e.g., the history timer 406) may be included within the display area 306 to enable an operator to view information associated with the status issues 504-512 for a selected time and/or time period. The status issues within the status rollup 502 may change to reflect status issues associated with a different selected and/or displayed portion of the process control system 104 and/or a different selected and/or displayed component type.

For example, if an operator had the schematic 304 displayed and scrolled to a different portion of the schematic 304 causing a different portion of the field devices 112 to be displayed, the status rollup 502 would automatically change the status issues displayed to reflect status issues that are associated with the displayed portion of the schematic 304. In this manner, the status rollup 502 provides an operator with Altered Alarms status issues that are associated with a portion of the schematic 304 the operator is viewing to assist the operator in determining the location and/or cause of the status issues. Further, an operator may store frequently used displays to the component type bar 308. Thus, every time an operator accesses a stored component type, the status rollup 502 automatically displays altered alarms associated with the selected component type.

FIG. 6 shows status issues within the status rollup 602 based on a selection by an operator of the Loops With Bad Mode status type. The Loops With Bad Mode status type may include process control routines, functions, and/or algorithms associated with the process control system 104 that have a deviation from a normal operating condition. A selection box 603 around the Loops With Bad Mode icon within the Improvement Opportunities Group 318 indicates that the Loops With Bad Mode status type was selected. In other examples, the Loops With Bad Mode may be selected from a menu, a list of status issue types, etc.

The example status rollup 602 is displayed as a table that includes process control information associated with each status issue 604-610. In other examples, the status rollup 602 may include a summary of each status issue organized and/or arranged by a priority and/or a severity. The example status rollup 602 of FIG. 6 includes process control information fields for a time (e.g., Time) when a loop error was detected (e.g., a timestamp), an identification value of a loop (e.g., TAG), a specified operating mode of a loop (e.g., Target Mode), a current operating mode of a loop (e.g., Current Mode), a duration of a loop issue (e.g., Duration), a cause of a loop issue (e.g., Reason), and an operator that detected a loop issue (e.g., Operator). Further, the status rollup 602 may include additional fields of process control information that may be related to a loop within a bad mode or, alternatively, may include fewer fields. An operator may use the information associated with each status issue 604-610 to determine if the corresponding loop should be fixed and/or modified to correct the issue.

The status issues 604-610 within the status rollup 602 are status issues that are associated with a selected portion of the process control system 104 (e.g., H2 Plant Tail End). Further, the status issues 604-610 are associated with the selected Loops With Bad Mode status type. Also, in some examples, a history timer (e.g., the history timer 406) may be included within the display area 306 to enable an operator to view information associated with the status issues 604-610 for a selected time and/or time period. The status issues listed within the status rollup 602 may change to reflect status issues associated with a different selected and/or displayed portion of the process control system 104 and/or a different selected and/or displayed component type.

FIG. 7 shows status issues within the status rollup 702 based on a selection by an operator of the Device Issues status type. The Device Issues status type may include field devices, components, controllers (e.g., the controller 108), I/O cards (e.g., the I/O device 118) associated with the process control system 104 that have a deviation from a normal operating condition. A selection box 703 around the Device Issues icon within the Improvement Opportunities Group 318 indicates that the Device Issues status type was selected. In other examples, the Device Issues may be selected from a menu, a list of status issue types, etc.

The example status rollup 702 of FIG. 7 is displayed as a table that includes process control information associated with each status issue 704-708. In other examples, the status rollup 702 may include a summary of each status issue organized and/or arranged by a priority and/or a severity. The example status rollup 702 includes process control information fields for a time (e.g., Time In) when a device issue was detected (e.g., a timestamp), an identification value of a device (e.g., TAG), a number of times per day that a device experiences an issue (e.g., Frequency/Day), a priority of a device (e.g., Asset Priority), a description of a device (e.g., Device Description), a description of a device issue (e.g., Alert Description), and a date a work order was created (e.g., Work Order). The Work Order field also includes a checked box indicating a work order was created. The checked box may also link to an electronic version of the corresponding work order. Further, the status rollup 702 may include additional fields of process control information that may be related to a device issue or, alternatively, may include fewer fields. An operator may use the information associated with each status issue 704-708 to determine if the corresponding device should be fixed and/or modified to correct the issue.

The status issues 704-708 within the status rollup 702 are status issues that are associated with a selected portion of the process control system 104 (e.g., H2 Plant Tail End). Further, the status issues 704-708 are associated with the selected Device Issues status type. Further, in some examples, a history timer (e.g., the history timer 406) may be included within the display area 306 to enable an operator to view information associated with the status issues 704-708 for a selected time and/or time period. The status issues listed within the status rollup 702 may change to reflect status issues associated with a different selected and/or displayed portion of the process control system 104 and/or a different selected and/or displayed component type.

Figure 8:
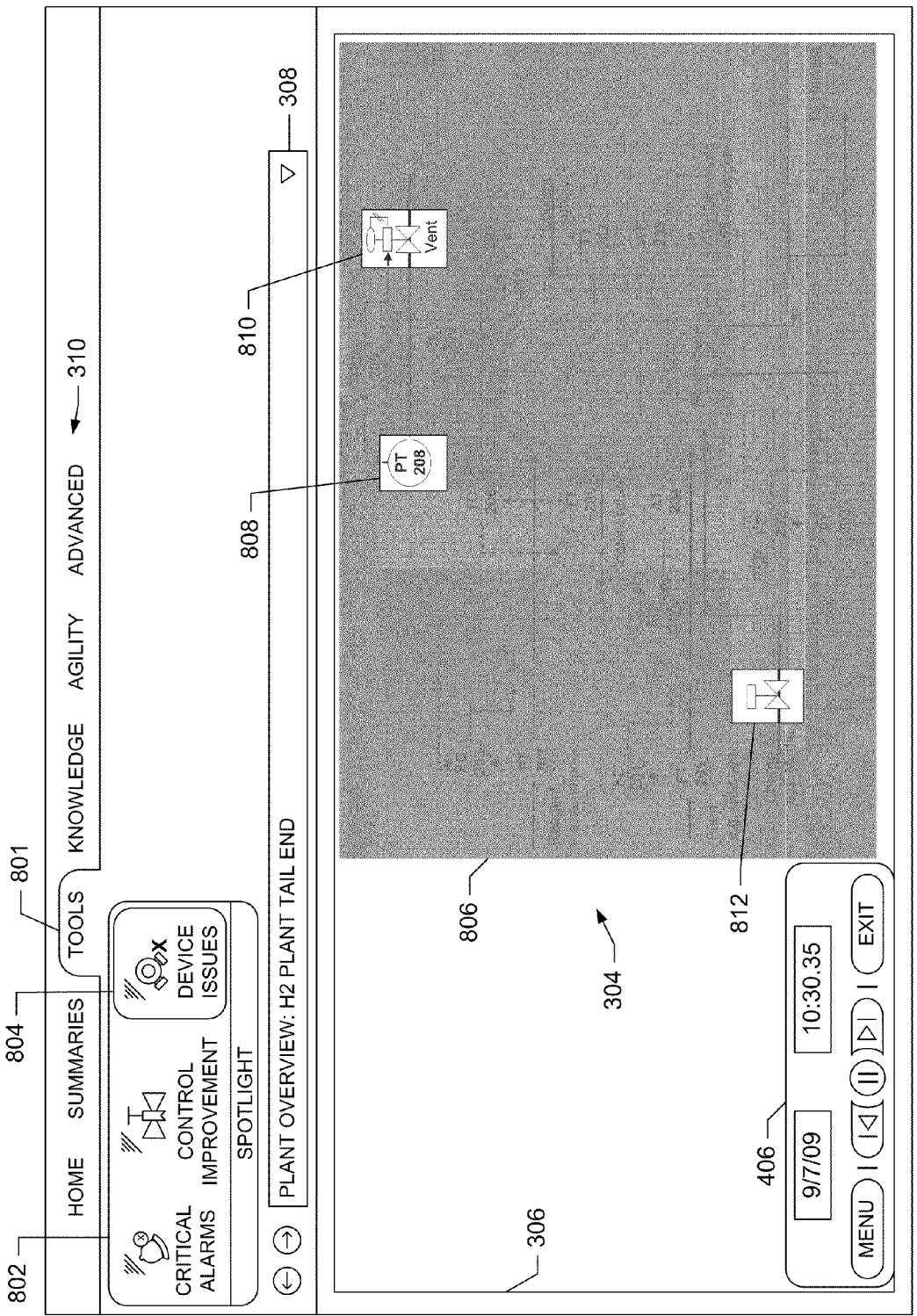
FIG. 8 shows the user interface of FIG. 1 including a highlight of the Device Issues status type of FIG. 7 associated with the process control system of FIGS. 1-3.

FIG. 8 shows the user interface 120 including a highlight of the Device Issues status type of FIG. 7 associated with the process control system of FIGS. 1-3. The user interface 120 includes the schematic 304, the display area 306, the component type bar 308, the menu bar 310, and the history timer 406 of FIG. 4. Additionally, the user interface 120 of FIG. 8 shows a Tools menu item 801 is selected that includes a Spotlight Group 802. The Spotlight Group 802 includes status issues types that may be highlighted within the schematic 304. A selection box 804 around the Device Issues icon indicates that the Device Issues status type was selected to be highlighted. By selecting the device issues highlight icon, an operator may easily view the location of the status issues 704-708 of FIG. 7 within the schematic 304. Alternatively, an operator may view a highlight of one or more status issues by selecting the status issues within a status rollup (e.g., the status rollups 302, 402, 502, 602 and/or 702).

The example user interface 120 shows a highlight of the status issues 704-708 at a date and time specified within the history timer 406. In some examples, the status rollup 702 may also be shown within the display area 306. Upon selecting the selection box 804, a shading 806 is applied to the schematic 304 to darken un-selected portions of the field devices 112 displayed within the schematic 304. Further, field devices 808-812 associated with the respective selected status issues 704-708 are highlighted within the schematic 304. For example, the status issue 704 may correspond to the highlighted field device 808. The status issue 706 may correspond to the highlighted field device 810 and the status issue 708 may correspond to the highlighted field device 812. Further, an operator may select the Critical Alarms status type and/or the Control Improvements status type to view the location within the schematic 304 of the status issues associated with those status types. Additionally, an operator may select any other status issue type to view the location within the schematic 304 of the status issues associated with those status types.

While the field devices 808-812 are shown as a transparent box, highlighting may also include displaying an animation of a graphic adjacent and/or over the field devices 808-812. Further, highlighting may include shading, coloring, and/or flashing a portion of the transparent box to create a more visually striking feature, and/or displaying some process control information associated with the status issue 704-708 adjacent to the corresponding field devices 808-812. Additionally, the shading 806 may be shown by obscuring, concealing, darkening, and/or removing from view the un-selected portions of the schematic 304. In some examples, the shading 806 may not be applied to the schematic 304 and only the selected portions of the schematic 304 are highlighted.

FIGS. 9A, 9B, 10A, 10B and 11 are flowcharts of example methods that may be carried out to implement the example process control information receiver 202, the example history writer 206, the example issue detector 214, the example rollup processor 214, the example history reader 215, the example selection receiver 216, the example status filter 220, the example history filter 222, the example component filter 224, the example display manager 226, the example highlight processor, and/or more generally, the status rollup processor 102 of FIGS. 1 and/or 2. The example methods of 9A, 9B, 10A, 10B and/or 11 may be carried out by a processor, a controller and/or any other suitable processing device. For example, the example methods of FIGS. 9A, 9B, 10A, 10B and/or 11 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform P10 discussed below in connection with FIG. 12). Combinations of the above are also included within the scope of computer-readable media.

Methods comprise, for example, instructions and/or data that cause a processor, a general-purpose computer, special-purpose computer, or a special-purpose processing machine to implement one or more particular methods. Alternatively, some or all of the example methods of FIGS. 9A, 9B, 10A, 10B and/or 11 may be implemented using any combination(s) of ASIC(s), PLD(s), FPLD(s), discrete logic, hardware, firmware, etc.

Also, some or all of the example methods of FIGS. 9A, 9B, 10A, 10B and/or 11 may instead be implemented using manual operations or as any combination of any of the foregoing techniques, for example, any combination of firmware, software, discrete logic and/or hardware. Furthermore, many other methods of implementing the example operations of FIGS. 9A, 9B, 10A, 10B and/or 11 may be employed. For example, the order of execution of the blocks may be changed, and/or one or more of the blocks described may be changed, eliminated, sub-divided, or combined.

Additionally, any or all of the example methods of FIGS. 9A, 9B, 10A, 10B and/or 11 may be carried out sequentially and/or carried out in parallel by, for example, separate processing threads, processors, devices, discrete logic, circuits, etc.

Figure 9A:
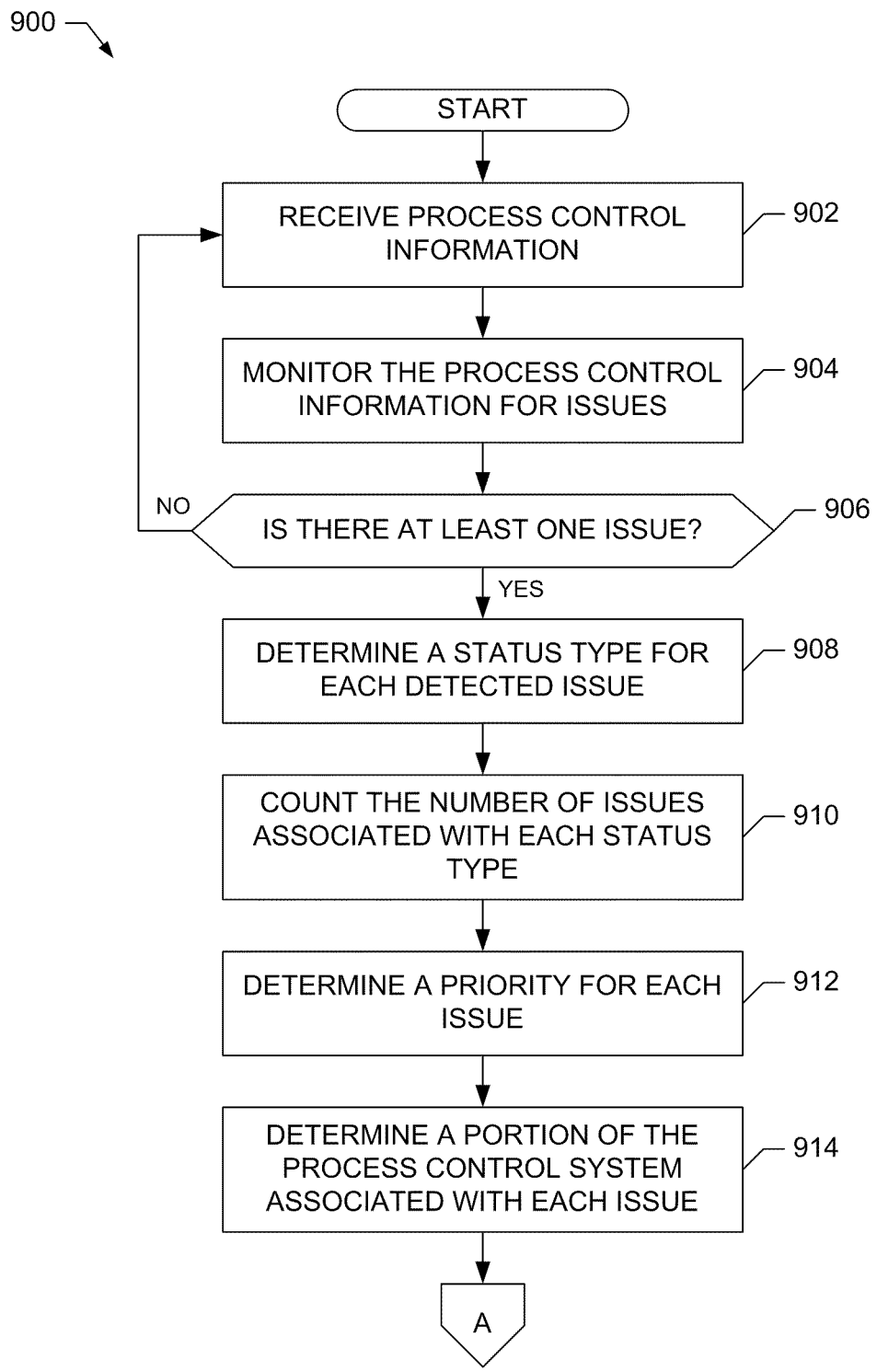
FIGS. 9A, 9B, 10A, 10B, and 11 are flowcharts of example methods that may be used to implement the example status rollup processor, an example process control information receiver, an example issue detector, an example rollup processor, an example display manager, an example highlight processor, an example status filter, an example history filter, and example component filter, an example history writer, an example history reader, and/or an example selection receiver of FIGS. 1 and/or 2.
Figure 9B:
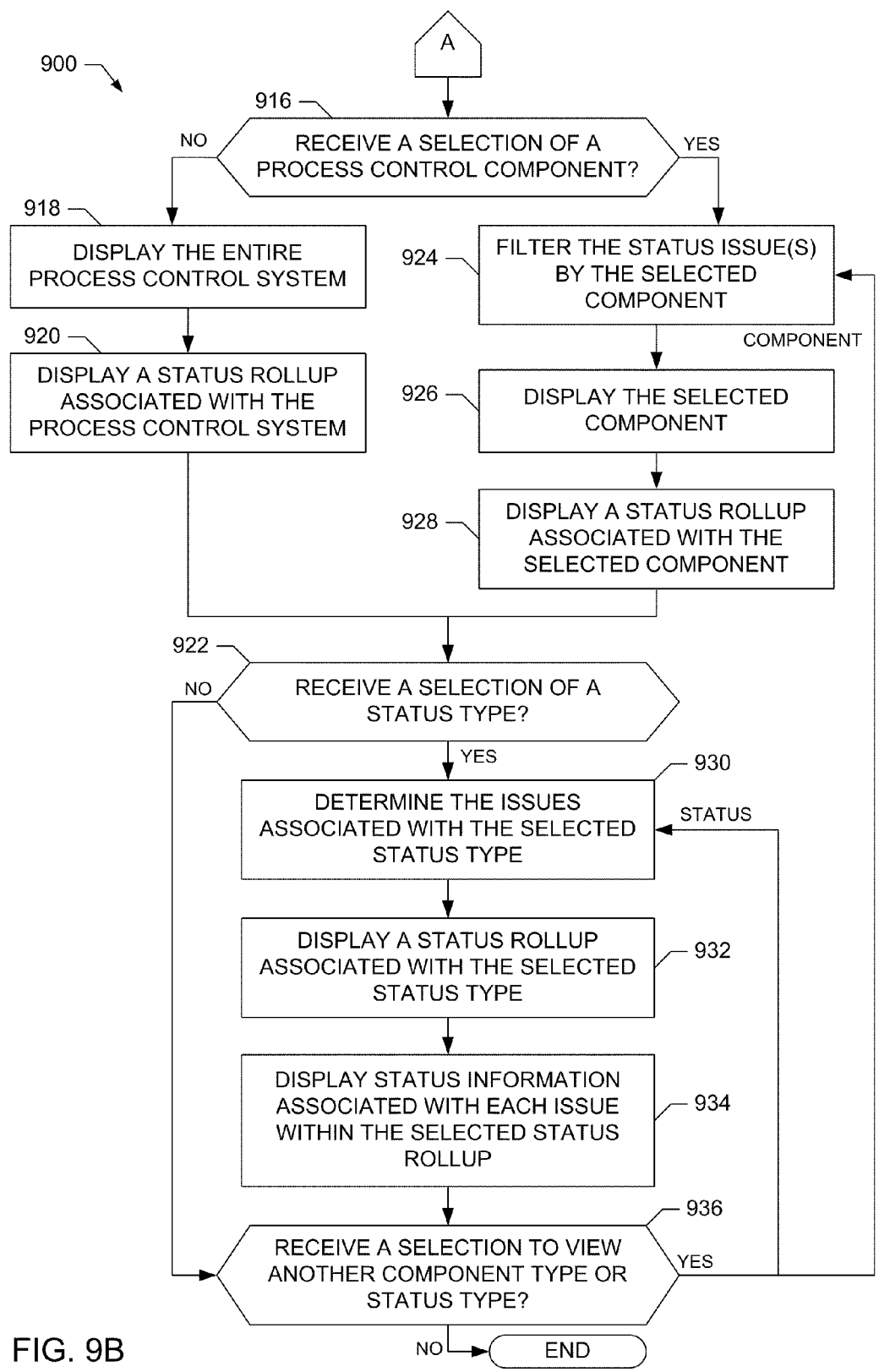

The example method 900 of FIGS. 9A and 9B display a status rollup based on a selected status type(s) and/or a component type(s). Multiple example methods 900 may be executed in parallel or series to create and display status rollups. Additionally, in examples where multiple user interfaces are displayed within a workstation, an example method 900 may be implemented for each interface or, alternatively, a single example method 900 may be implemented for the workstation.

The example method 900 of FIG. 9A begins by receiving process control information from a process control system (block 902). The process control information may originate from a process control device which may include, for example, a field device, a controller, a component, etc. Additionally or alternatively, the example method 900 may begin when an operator opens a user interface to view a graphical and/or data representation of a process control system. Next, the example method 900 monitors the process control information for issues (block 904). The issues may include status issues, monitoring information, alarm information, diagnostics, message information, etc. The example method 900 then determines if there is at least one issue (block 906). If the example method 900 does not detect at least one issue, the example method 900 continues to receive process control information (block 902).

However, if the example method 900 detects at least one issue, the example method 900 determines a status type that is associated with each detected issue (block 908). The example method 900 may also continue to receive process control information (not shown). The example method 900 then counts and/or compiles the number of issues associated with each status type (block 910). Further, the example method 900 determines a priority and/or a severity for each detected issue (block 912). Next, the example method 900 determines a portion of a process control system and/or components of a process control system that are associated with each issue (block 914). In some examples, the example method 900 may receive a selection of a portion of a process control system and/or a selection of a component type prior to receiving process control information. In these examples, the example method 900 may filter the issues and/or the process control information based on the selected component type and/or portion of a process control system.

The example method 900 of FIG. 9B continues by determining if a selection of a process control component (e.g., a component type) has been received (block 916). If a selection has not been received, the example method 900 displays a graphical and/or data representation of the entire process control system (block 918). The example method 900 then creates and displays a status rollup associated with the displayed process control system (block 920).

However, if the example method 900 does receive a selection of a process control component (block 916), the example method 900 filters the process control information and/or status issues by the selected process control component type (block 924). In some examples, a component type may include a selection of a portion of a process control system. Next, the example method 900 displays the selected component (block 926). In some examples, the selected component may be displayed without an execution by the example method 900 (e.g., a user interface may manage the display of a selected component). The example method 900 then creates and displays a status rollup associated with the selected component (block 928). Following blocks 920 and 928, the example method 900 determines if a selection of a status type was received (block 922).

If a selection of a status type was received, the example method 900 continues by determining which issues are associated with the selected status type (block 930). The example method 900 may determine which issues are associated with a selected status type by matching an identifier associated with the selected status type to identifiers associated with the issues. The example method 900 then filters the issues by the selected status type and displays the filtered issues within a status rollup (block 932). The example method 900 may also display status information, process control information, and/or any other associated information type that corresponds to each issue within the status rollup (block 934). In some examples, the example method 900 may also receive a selection of a sub-status type. In these examples, the example method 900 may filter the issues by the sub-status type and display a corresponding status rollup.

The example method 900 then determines if a selection has been received to view another component type and/or another status type (block 936). Further, if a selection of a status type was not received by the example method (block 922), the example method 900 determines if a selection has been received to view another component type and/or another status type (block 936).

If the example method 900 receives a selection to view another component type, the example method 900 filters the process control information and/or status issues by the selected process control component type (block 924). The example method 900 may receive a selection to view another component type by receiving a selection of another portion of a schematic and/or functional block diagram that graphically represents the process control system. Alternatively, if the example method 900 receives a selection to view another status type, the example method 900 determines the issues that are associated with the selected status type (block 930). However, if the example method 900 does not receive a selection to view another component type and/or status type, the example method 900 ends. Alternatively, the example method 900 may wait for a selection and end when an operator closes and/or terminates the user interface associated with the example method 900.

Figure 10A:
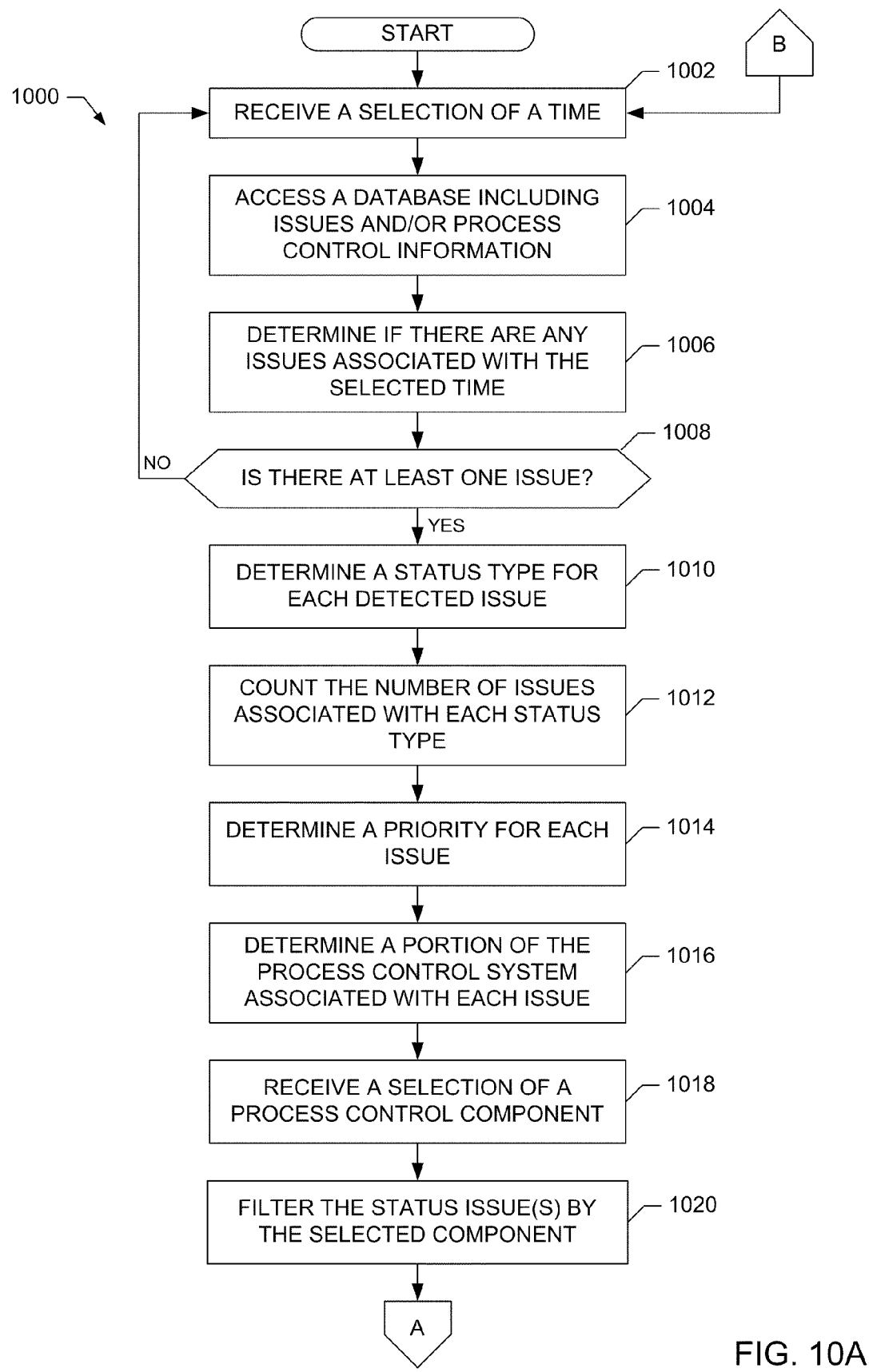
Figure 10B:
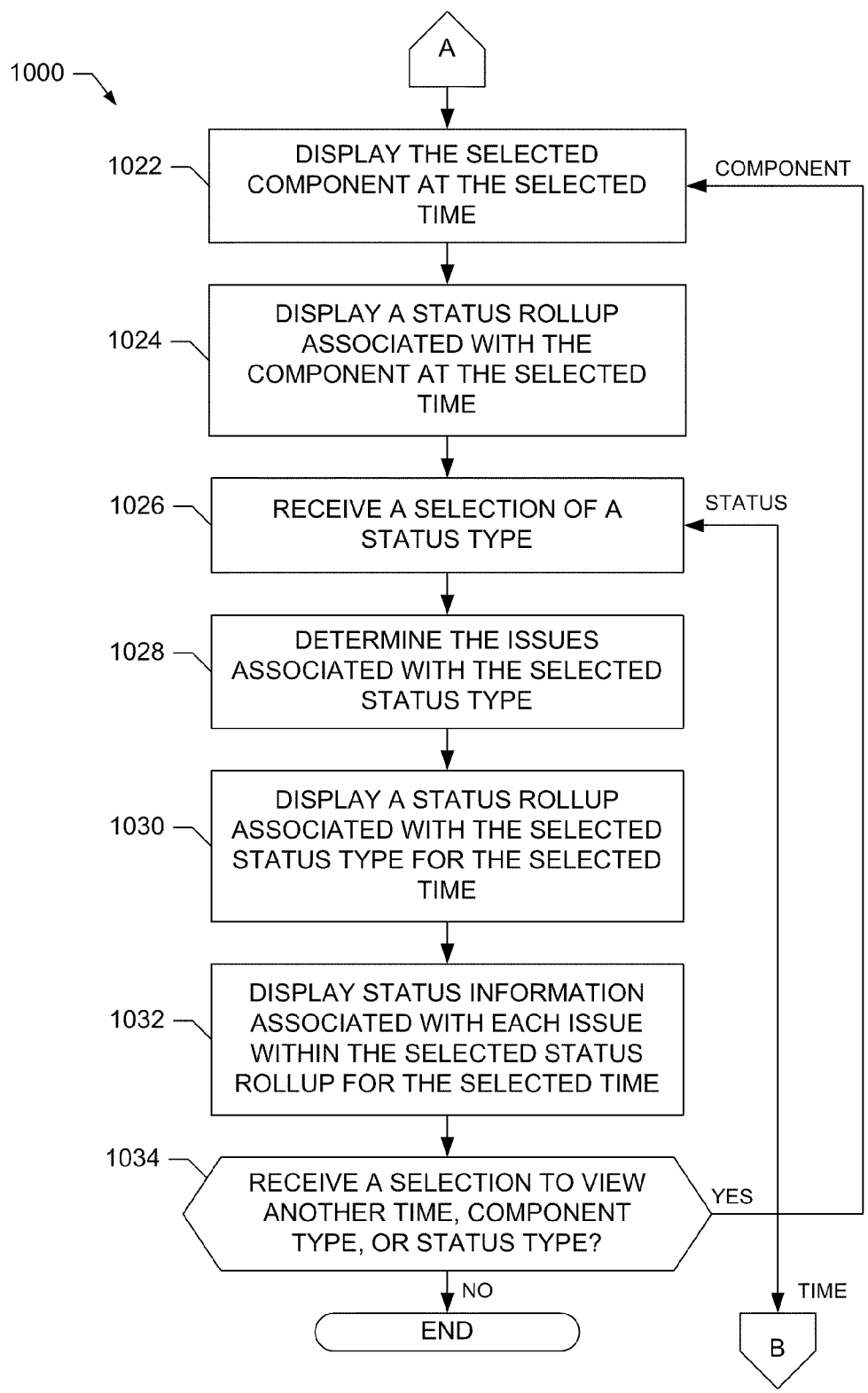

The example method 1000 of FIGS. 10A and 10B displays a status rollup based on a selected time(s) and/or time period(s). Multiple example methods 1000 may be executed in parallel or series to create and display status rollups. Additionally, in examples where multiple user interfaces are displayed within a workstation, an example method 1000 may be implemented for each user interface or, alternatively, a single example method 1000 may be implemented for the workstation. While the example method 1000 shows a selection of a time and/or a time period followed by a selection of a status type and a component type, other example methods 1000 may be implemented where a status type and/or a component type is selected prior to receiving a selection of a time and/or a time period.

The example method 1000 of FIG. 10A begins by receiving a selection of a time (block 1002). Additionally, the example method 1000 may begin by receiving process control information, opening a user interface, receiving a selection of a component type, and/or receiving a selection of a status type. Next, the example method 1000 accesses a database (e.g., the process control information database 208) that includes issues (e.g., status issues, diagnostics, alarm information, message information, etc.) and/or process control information (block 1004). The example method 1000 then determines if there are any issues associated with the selected time and/or time period by examining a timestamp that may be associated with each issue (block 1006).

If the example method 1000 determines that there is not at least one issue associated with the time and/or time period (block 1008), the example method 1000 may receive a selection of another time and/or time period (block 1002). However, if the example method 1000 determines there is at least one issue associated with the time and/or time period (block 1008), the example method 1000 determines a status type for each issue that is associated with the time and/or the time period (block 1010). Next, the example method 1000 counts and/or compiles the number of issues associated with each status type (block 1012) and determines a priority and/or severity for each compiled issue (block 1014). The example method 1000 then determines a portion of a process control system and/or a component type that is associated with each issue (block 1016).

The example method 1000 continues by receiving a selection of a process control component (block 1018). The example method 1000 then filters the status issue(s) by the select component type and/or portion of a process control system (block 1020). The example method 1000 of FIG. 10B then displays the selected component type and/or portion of the process control system for the selected time and/or time period (block 1022). Next, the example method 1000 creates and displays the status rollup for the component type at the selected time and/or time period (block 1024). At this point, the example method 1000 displays a status rollup including a number of status issues by all possible status types that are associated with the selected component type and the selected time and/or time period. In some examples, the example method 1000 may not receive a selection of a component type and/or a portion of a process control system. In these examples, the example method 1000 may display a status rollup for the entire process control system for the selected time and/or time period.

The example method 1000 then receives a selection of a status type (block 1026). Upon receiving a selection of a status type, the example method 1000 determines issues (e.g., status issues) that are associated with the selected status type (block 1028). The example method 1000 then displays a status rollup associated with the selected status type (block 1030). This status rollup may include process control information and/or additional status issue information that are associated with the selected status type. Next, the example method 1000 displays any status information, process control information, and/or any other relevant status issue information for each issue associated with the selected status type (block 1032).

The example method 1000 of FIG. 10B continues by determining if a selection was received to view another component type, status type, time, and/or time period (block 1034). If a component type was selected, the example method 1000 displays the selected component type and/or portion of the process control system for the time and/or time period (block 1022). If a status type was selected, the example method 1000 receives the selected status type (block 1026). Further, if a new time and/or time period is selected, the example method 1000 of FIG. 10A receives a selection of the time and/or time period (block 1002). However, if a selection was not received, the example method 1000 ends. Alternatively, the example method 1000 may wait for a selection and end when an operator closes and/or terminates the user interface associated with the example method 1000.

Figure 11:
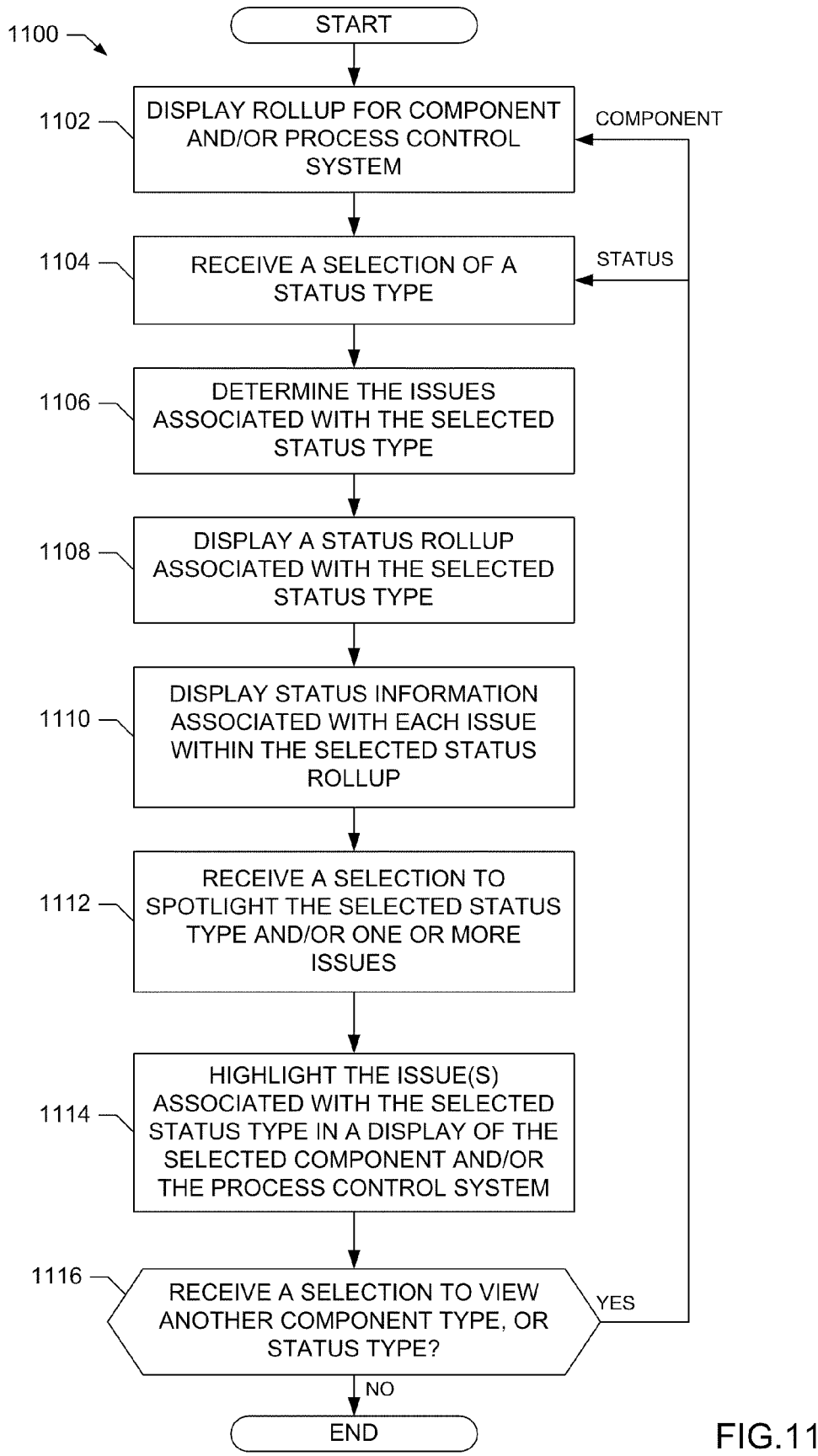

The example method 1100 of FIG. 11 displays a highlight of a status type based on a selected status type. Multiple example methods 1100 may be executed in parallel or series to manage and/or display a highlight of status issues. Additionally, in examples where multiple user interfaces are displayed within a workstation, an example method 1100 may be implemented for each user interface or, alternatively, a single example method 1100 may be implemented for the workstation.

The example method 1100 of FIG. 11 begins by displaying a rollup (e.g., a status rollup) for a component type and/or a portion of a process control system (block 1102). Alternatively, the example method 1100 may begin by an operator opening a user interface and/or by receiving process control information. Next, the example method 1100 receives a selection of a status type (block 1104). Upon receiving the selected status type, the example method 1100 determines status issues that are associated with the status type (block 1106). The example method 1100 then creates and displays a status rollup for the selected status type that may include status information, process control information, and/or any other status issue information for each status issue (block 1110).

The example method 1100 then receives a selection to spotlight (e.g., highlight) the selected status type and/or one or more status issues associated with the status type (block 1112). Alternatively, the example method 1100 may receive a selection to highlight a status type without receiving a selection to view a status rollup for a status type. Next, the example method 1100 highlights the issue(s) associated with the selected status type in a display of a graphical and/or data representation of the selected portion of the process control system and/or component type (block 1114).

The example method 1100 may highlight the status issues by determining which field devices and/or other components within a display are associated with the selected status type. Then, the example method 1100 highlights the field devices and/or components with the display by darkening un-selected field devices and/or by brightening or boxing the selected field devices. Further, the example method 1100 may highlight a status type for a selected time and/or time period. Additionally, an operator may select an individual issue to view the issue highlighted within the graphical and/or data representation of the process control system.

The example method 1100 of FIG. 11 continues by determining if a selection was received to view another component type and/or status type (block 1116). If a component type was selected, the example method 1100 displays the selected component type and/or portion of the process control system (block 1102). If a status type was selected, the example method 1100 receives the selected status type (block 1104). However, if a selection was not received, the example method 1100 ends. Alternatively, the example method 1100 may wait for a selection and end when an operator closes and/or terminates the user interface associated with the example method 1100.

Figure 12:
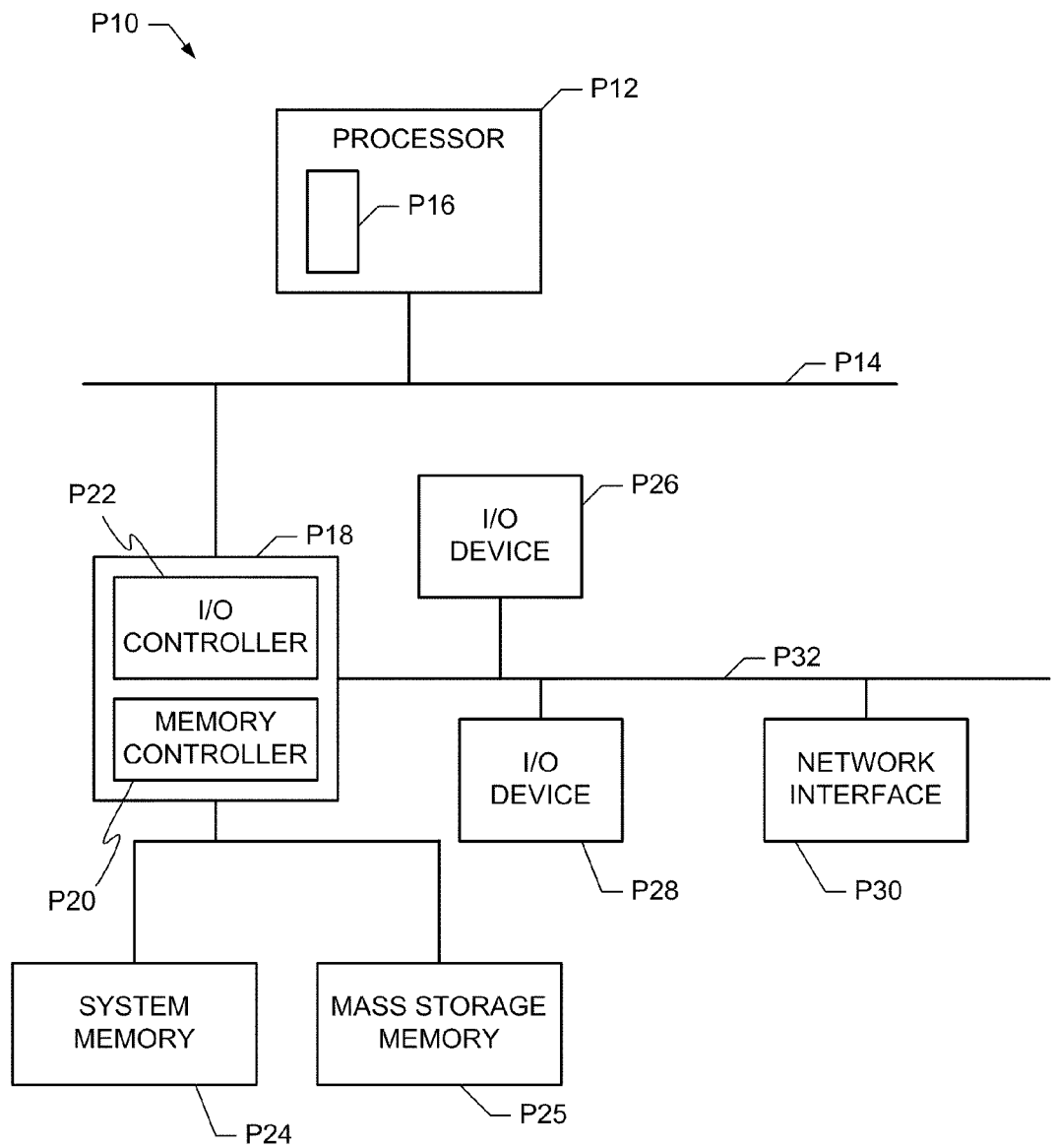
FIG. 12 is a block diagram of an example processor system that may be used to implement the example methods and apparatus described herein.

FIG. 12 is a block diagram of an example processor system P10 that may be used to implement the example methods and apparatus described herein. For example, processor systems similar or identical to the example processor system P10 may be used to implement the example process control information receiver 202, the example history writer 206, the example issue detector 214, the example rollup processor 214, the example history reader 215, the example selection receiver 216, the example status filter 220, the example history filter 222, the example component filter 224, the example display manager 226, the example highlight processor, and/or more generally, the status rollup processor 102 of FIGS. 1 and/or 2. Although the example processor system P10 is described below as including a plurality of peripherals, interfaces, chips, memories, etc., one or more of those elements may be omitted from other example processor systems used to implement one or more of the example process control information receiver 202, the example history writer 206, the example issue detector 214, the example rollup processor 214, the example history reader 215, the example selection receiver 216, the example status filter 220, the example history filter 222, the example component filter 224, the example display manager 226, the example highlight processor 230, and/or more generally, the status rollup processor 102.

As shown in FIG. 12, the processor system P10 includes a processor P12 that is coupled to an interconnection bus P14. The processor P12 includes a register set or register space P16, which is depicted in FIG. 12 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 12, the system P10 may be a multi-processor system and, thus, may include one or more additional processors that are identical or similar to the processor P12 and that are communicatively coupled to the interconnection bus P14.

The processor P12 of FIG. 12 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the status rollup processor 102 (FIG. 2), the mass storage memory P25 may include a hard disk drive, an optical drive, a tape storage device, etc. Alternatively, if the example processor system P10 is used to implement the process control information database 208, the mass storage memory P25 may include a solid-state memory (e.g., a flash memory, a RAM memory, etc.), a magnetic memory (e.g., a hard drive), or any other memory suitable for mass storage in the process control information database 208.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 12 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to manage process control status rollups, the method comprising:
   receiving a selection of a portion of a graphical representation of a process control system, wherein the selected portion of the graphical representation includes visual representations of components of a portion of the process control system, the selected portion of the graphical representation including at least one of tags or identifiers assigned to the components, the at least one of the tags or identifiers displayed in proximity to the components;
   identifying the at least one of the tags or identifiers displayed in the selected portion of the graphical representation based on an analysis of the selected portion of the graphical representation;
   identifying the components visually represented in the selected portion of the graphical representation based on the identified at least one of the tags or the identifiers;
   receiving process control information indicative of issues within the process control system;
   identifying a portion of the issues associated with the components visually represented in the selected portion of the graphical representation;
   determining, via an issue detector, at least one of a priority or a severity for ones of the portion of the issues;
   calculating, via a rollup processor, a numerical status factor based on a compilation of at least one of a number, the severity, the priority, or a status type of the ones of the portion of the issues and at least a second different one of the number, the severity, the priority, or the status type of the ones of the portion of the issues; and
   displaying a process control status rollup generated to correspond to the selected portion of the graphical representation, the process control status rollup providing information indicative of the portion of the issues, the information including the status factor.

2. A method as defined in claim 1, further comprising:
   receiving a selection of a particular status type;
   identifying a subset of the issues associated with the particular status type, the subset of the issues associated with the particular status type identified from the portion of the issues, wherein the status type includes at least one of an alarm, a message, a simulation, a field device issue, an abnormal condition, a knowledge available condition, a field device maintenance condition, a field device status condition, an improve control condition, an altered alarm, an action request, an altered field device, a control bypass, a process control routine with an improper mode, a process control routine with an issue, an alarm with an issue, or a user defined condition; and
   displaying the subset of the issues associated with the particular status type within the process control status rollup.

3. A method as defined in claim 2, further comprising:
   determining a priority for at least one of the issues, the priority associated with the particular status type; and
   displaying a priority indicator corresponding to the determined priority for the at least one of the issues.

4. A method as defined in claim 2, further comprising:
   prior to receiving the particular status type, determining different status types associated with different ones of the issues in the portion of the issues associated with the components;
   counting a number of issues of the portion of the issues associated with each of the different status types; and
   displaying in the process control status rollup at least one of the portion of the issues, the different status types associated with the different ones of the issues in the portion of the issues, or the number of issues of the portion of the issues associated with each of the different status types.

5. A method as defined in claim 4, further comprising:
   calculating the status factor for each of the different status types based on the subset of the issues associated with the particular status type; and
   calculating a process factor based on the status factor.

6. A method as defined in claim 5, wherein the status factor is at least one of a summary, a safety summary, an availability summary, or a reliability summary of the subset of the issues associated with the particular status type.

7. A method as defined in claim 5, wherein the process factor is at least one of a summary, a safety summary, an availability summary, or a reliability summary of the status factor.

8. A method as defined in claim 2, further comprising:
   receiving a selection of a sub-status type included within the particular status type;
   determining if at least one of the issues from the subset of the issues associated with the particular status type is associated with the sub-status type; and
   displaying the at least one of the issues in the process control status rollup associated with the sub-status type.

9. A method as defined in claim 2, further comprising upon receiving the selection of the status type, displaying at least one of the issues from the subset of the issues associated with the particular status type in the portion of the graphical representation by highlighting at least part of the portion of the graphical representation that is associated with the at least one of the issues.

10. A method as defined in claim 2, further comprising calculating the status factor based on at least one of the issues associated with the particular status type.

11. A method as defined in claim 2, further comprising:
    prior to receiving the selection of the status type, receiving a selection of a process control component type;
    determining if at least one of the issues is associated with the selected process control component type; and
    displaying the at least one of the issues in a second process control status rollup associated with the selected process control component type.

12. A method as defined in claim 11, wherein the process control component type includes at least one of a field device, a process control component, a process control unit of equipment, a type of field device, an area of field devices, a process control area, at least one area of control of an operator, a batch area, at least one field device associated with a batch process, or a display area.

13. A method as defined in claim 1, further comprising:
    receiving a selection of a time;
    determining at least one issue associated with the process control system that occurred at the selected time;
    receiving a selection of a particular status type;
    determining if the at least one issue at the selected time is associated with the particular status type; and displaying the at least one issue associated with the particular status type and indicating the at least one issue occurred at the selected time.

14. A method as defined in claim 1, further comprising:
determining at least one of a description of at least one of the issues, a device status description associated with the at least one of the issues, a frequency of the at least one of the issues, a date of occurrence of the at least one of the issues, a time of occurrence of the at least one of the issues, an operating mode of the at least one of the issues, an operator description of the at least one of the issues, a location of the at least one of the issues, a first identifier of the identifiers associated with the at least one of the issues, or at least one mitigation action for the at least one of the issues; and
displaying at least one of the description of the at least one of the issues, the device status description associated with the at least one of the issues, the frequency of the at least one of the issues, the date of occurrence of the at least one of the issues, the time of occurrence of the at least one of the issues, the operating mode of the at least one of the issues, the operator description of the at least one of the issues, the location of the at least one of the issues, the first identifier associated with the at least one of the issues, or the at least one mitigation action for the at least one of the issues.

15. A method as defined in claim 1, further comprising upon receiving a selection of at least one of the issues, displaying the at least one of the issues in the graphical representation by highlighting at least a portion of the graphical representation that is associated with the selection of the at least one of the issues.

16. A method as defined in claim 1, wherein the portion of the graphical representation is selected independent of a hierarchy associated with the process control system.

17. A method as defined in claim 1, further comprising identifying the at least one of the tags or the identifiers associated with the components based on a text search of the selected portion of the graphical representation.

18. A method as defined in claim 1, wherein the process control status rollup is displayed in at least one of a user interface, a process control interface, a graphical user interface, or a web-based user interface.

19. A method as defined in claim 1, further comprising:
receiving a selection of a time period;
determining one or more status issues that occurred during the time period; and
displaying the one or more status issues that occurred during the time period within the process control status rollup.

20. An apparatus to manage process control status rollups, the apparatus comprising:
an issue detector to determine issues within a process control system based on received process control information, the issue detector to determine at least one of a priority or a severity for the issues;
a component filter to:
identify at least one of tags or identifiers displayed in a selected portion of a graphical representation of the process control system;
identify components visually represented in the selected portion of the graphical representation based on the identified at least one of the tags or the identifiers displayed in proximity to the components in the selected portion of the graphical representation, each of the at least one of the tags or the identifiers assigned to a corresponding one of the components of the process control system;
a rollup processor to identify a portion of the issues associated with the components visually represented in the selected portion of the graphical representation, the rollup processor to calculate a numerical status factor based on a compilation of at least one of a number, the severity, the priority, or a status type of ones of the portion of the issues and at least a second different one of the number, the severity, the priority, or the status type of the ones of the portion of the issues; and
a display manager to display a process control status rollup generated to correspond to the selected portion of the graphical representation, the process control status rollup providing information indicative of the identified portion of the issues, the information including the status factor.

21. An apparatus as defined in claim 20, further comprising:
a process control information receiver to receive the process control information from at least one process control device included within the process control system; and
a selection receiver to at least one of:
receive a selection of a particular status type;
receive a selection of a second status type;
receive a selection of a sub-status type included within the particular status type;
receive a selection of a process control component type; or
receive a selection of a time.

22. An apparatus as defined in claim 21, wherein the rollup processor is to:
determine at least one of the issues associated with the process control system that occurred at the selected time by accessing a process control information database that includes process control information associated with the selected time; and
determine if the at least one of the issues at the selected time is associated with the selected second status type.

23. An apparatus as defined in claim 22, wherein the display manager is to display the at least one of the issues associated with the selected second status type with an indication that the at least one of the issues occurred at the selected time.

24. An apparatus as defined in claim 21, wherein:
the rollup processor is to determine if at least one of the issues is associated with the sub-status type; and
the display manager is to display the at least one of the issues in the process control status rollup associated with the sub-status type.

25. An apparatus as defined in claim 21, wherein:
the rollup processor is to determine if at least one of the issues is associated with the selected process control component type; and
the display manager is to display the at least one of the issues in a second process control status rollup associated with the selected process control component type.

26. An apparatus as defined in claim 20, wherein:
the rollup processor is to determine at least one of a description of at least one of the issues, a device status description associated with the at least one of the issues, a frequency of the at least one of the issues, a date of occurrence of the at least one of the issues, a time of occurrence of the at least one of the issues, an operating mode of the at least one of the issues, an operator description of the at least one of the issues, a location of the at least one of the issues, a first identifier of the identifiers associated with the at least one of the issues, or at least one mitigation action for the at least one of the issues; and the display manager is to display at least one of the description of the at least one of the issues, the device status description associated with the at least one of the issues, the frequency of the at least one of the issues, the date of occurrence of the at least one of the issues, the time of occurrence of the at least one of the issues, the operating mode of the at least one of the issues, the operator description of the at least one of the issues, the location of the at least one of the issues, the first identifier associated with the at least one of the issues, or the at least one mitigation action for the at least one of the issues.

27. An apparatus as defined in claim 20, wherein:

the issue detector is to determine a priority for at least one of the issues, the priority associated with a selected status type; and the display manager is to display a priority indicator corresponding to the determined priority for the at least one of the issues.

28. An apparatus as defined in claim 21, wherein the rollup processor is to:

prior to receiving the selection of the particular status type, determine different status types associated with different ones of the issues associated with the components;

count a number of the issues associated with each of the different status types;

calculate the status factor for each of the different status types based on the portion of the issues associated with the particular status type; and calculate a process factor based on the status factor.

29. An apparatus as defined in claim 28, wherein the display manager is to display in the process control status rollup at least one of the at least one of the issues, the particular status type associated with the at least one issue, or the number of the issues associated with each different status type.

30. An apparatus as defined in claim 20, further comprising a highlight processor to at least one of:

display at least one of the issues associated with a selected status type in the portion of the graphical representation by highlighting at least part of the portion of the graphical representation that is associated with the at least one of the issues; or display at least one selected issue in the graphical representation by highlighting at least part of the portion of the graphical representation that is associated with the selection of the at least one selected issue.

31. An apparatus as defined in claim 20, wherein the rollup processor is to calculate the status factor based on at least one of the issues associated with a selected status type.

32. An apparatus as defined in claim 20, wherein the process control status rollup is displayed in at least one of a user interface, a process control interface, a graphical user interface, or a web-based user interface.

33. A tangible machine readable storage device having instructions stored thereon that, when executed, cause a machine to:

receive a selection of a portion of a graphical representation of a process control system, wherein the selected portion of the graphical representation includes visual representations of components of a portion of the process control system, the selected portion of the graphical representation including at least one of tags or identifiers assigned to the components, the at least one of tags or identifiers displayed in proximity to the components;

identify the at least one of the tags or the identifiers displayed in the selected portion of the graphical representation based on an analysis of the selected portion of the graphical representation;

identify the components visually represented in the selected portion of the graphical representation based on the identified at least one of the tags or the identifiers;

receive process control information indicative of issues within the process control system;

identify a portion of the issues associated with the components visually represented in the selected portion of the graphical representation;

determine at least one of a priority or a severity for ones of the portion of the issues;

calculate a numerical status factor based on a compilation of at least one of a number, the severity, the priority, or a status type of the ones of the portion of the issues and at least a second different one of the number, the severity, the priority, or the status type of the ones of the portion of the issues; and display a process control status rollup generated to correspond to the selected portion of the graphical representation, the process control status rollup providing information indicative of the portion of the issues, the information including the status factor.

* * * * *